(12) United States Patent
Takimoto et al.

(10) Patent No.: US 11,531,225 B2
(45) Date of Patent: Dec. 20, 2022

(54) DISPLAY DEVICE AND ELECTRONIC EQUIPMENT INCORPORATING THE DISPLAY DEVICE

(71) Applicant: Japan Display Inc., Tokyo (JP)

(72) Inventors: Akio Takimoto, Tokyo (JP); Toshiki Kaneko, Tokyo (JP); Takuo Kaitoh, Tokyo (JP); Kazuhiro Nishiyama, Tokyo (JP); Hiroyuki Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/533,705

(22) Filed: Nov. 23, 2021

(65) Prior Publication Data

US 2022/0082883 A1 Mar. 17, 2022

Related U.S. Application Data

(63) Continuation of application No. 17/153,336, filed on Jan. 20, 2021, now Pat. No. 11,215,862, which is a (Continued)

(30) Foreign Application Priority Data

Jul. 20, 2018 (JP) .............................. JP2018-137025

(51) Int. Cl.
*G02F 1/1333* (2006.01)
*G02F 1/29* (2006.01)
(Continued)

(52) U.S. Cl.
CPC ..... *G02F 1/133388* (2021.01); *G02B 6/0081* (2013.01); *G02F 1/133314* (2021.01); *G02F 1/133512* (2013.01); *G02F 1/133514* (2013.01); *G02F 1/294* (2021.01); *H04N 5/2257* (2013.01); *G02B 6/0051* (2013.01);
(Continued)

(58) Field of Classification Search
CPC .................................................. G02F 1/133388
See application file for complete search history.

(56) References Cited

U.S. PATENT DOCUMENTS

2009/0102763 A1 4/2009 Border et al.
2010/0045963 A1 2/2010 Yamaguchi et al.
(Continued)

FOREIGN PATENT DOCUMENTS

JP 2002-148511 A 5/2002
JP 2007-163816 A 6/2007
(Continued)

OTHER PUBLICATIONS

International Search Report dated Aug. 6, 2019 in PCT/JP2019/020784 filed May 24, 2019, 6 pages.
(Continued)

*Primary Examiner* — Edmond C Lau
(74) *Attorney, Agent, or Firm* — Maier & Maier, PLLC

(57) ABSTRACT

According to one embodiment, an electronic equipment includes a liquid crystal panel including a display portion, a polarizer superposed on the display portion, and a detection element superposed on the liquid crystal panel and the polarizer to detect infrared rays through the liquid crystal panel and the polarizer.

7 Claims, 19 Drawing Sheets

Related U.S. Application Data continuation of application No. PCT/JP2019/020784, filed on May 24, 2019.

(51) Int. Cl.
*F21V 8/00* (2006.01)
*G02F 1/1335* (2006.01)
*H04N 5/225* (2006.01)
*G02F 1/1343* (2006.01)

(52) U.S. Cl.
CPC ........ *G02B 6/0053* (2013.01); *G02F 1/13439* (2013.01); *G02F 1/133504* (2013.01); *G02F 1/134363* (2013.01)

(56) References Cited

U.S. PATENT DOCUMENTS

| | | |
|---|---|---|
| 2013/0063676 A1 | 3/2013 | Tsuchihashi et al. |
| 2013/0258234 A1 | 10/2013 | Park |
| 2015/0316702 A1 | 11/2015 | Ilmonen et al. |
| 2016/0161664 A1 | 6/2016 | Ishida |
| 2016/0370661 A1* | 12/2016 | Ono .................... G02F 1/13624 |
| 2017/0053592 A1 | 2/2017 | Shin et al. |
| 2018/0307270 A1* | 10/2018 | Pantel .................... G06F 1/1686 |
| 2019/0146146 A1* | 5/2019 | Nakajima ......... G02F 1/133528 362/611 |
| 2019/0258112 A1 | 8/2019 | Nagasaki et al. |

FOREIGN PATENT DOCUMENTS

| | | |
|---|---|---|
| JP | 2008-310101 A | 12/2008 |
| JP | 2010-48606 A | 3/2010 |
| JP | 2010-187184 A | 8/2010 |
| JP | 2011-504242 A | 2/2011 |
| JP | 2011-65411 A | 3/2011 |
| JP | 2013-61436 A | 4/2013 |
| JP | 2016-510481 A | 4/2016 |
| JP | 2017-40908 A | 2/2017 |
| WO | WO 2015/022887 A1 | 2/2015 |
| WO | WO 2018/083817 A1 | 5/2018 |

OTHER PUBLICATIONS

Office Action dated Jul. 12, 2022 in corresponding Japanese Patent Application No. 2018-137025; 17 pages including English-language translation.

* cited by examiner

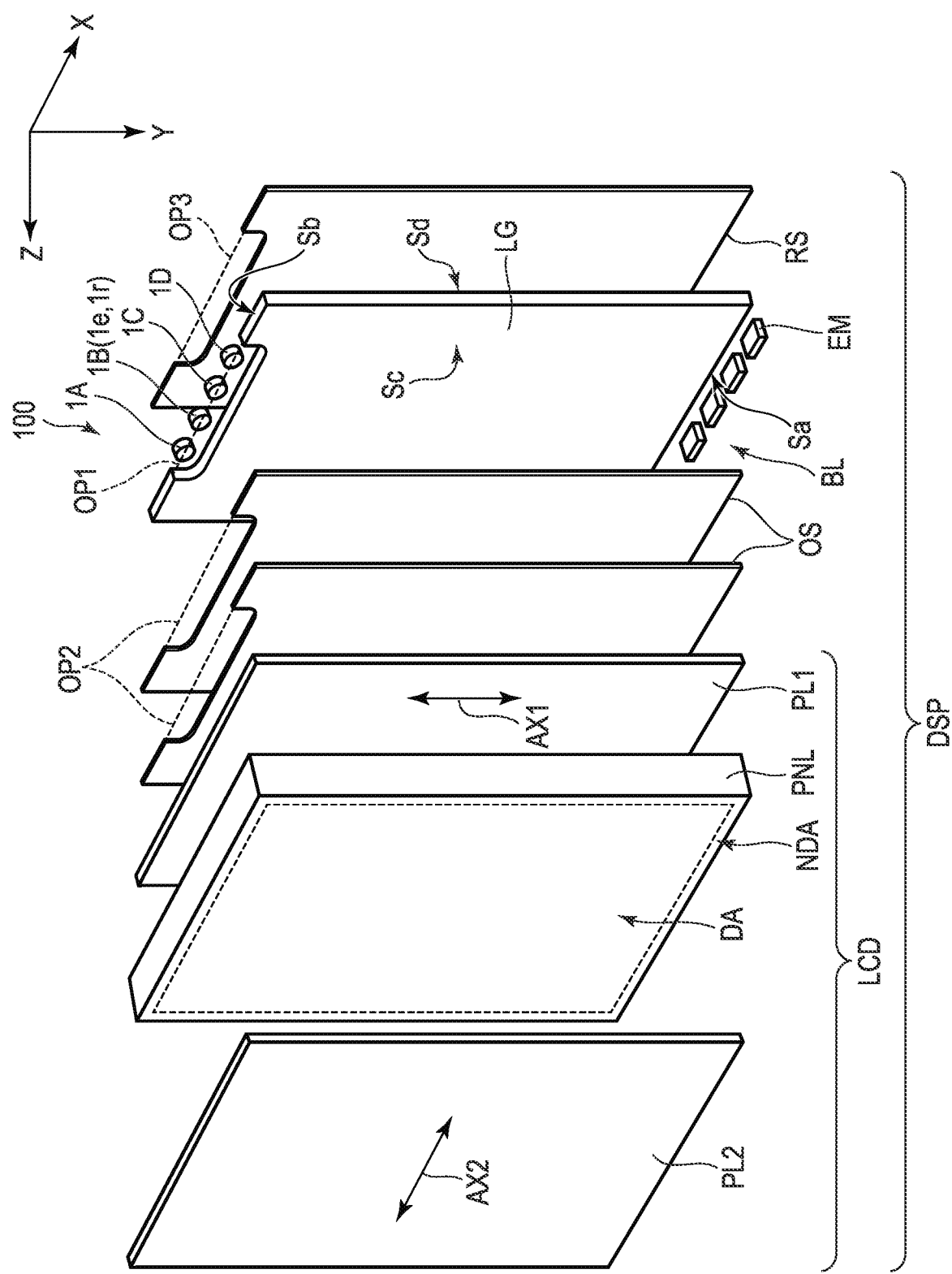
F I G. 1

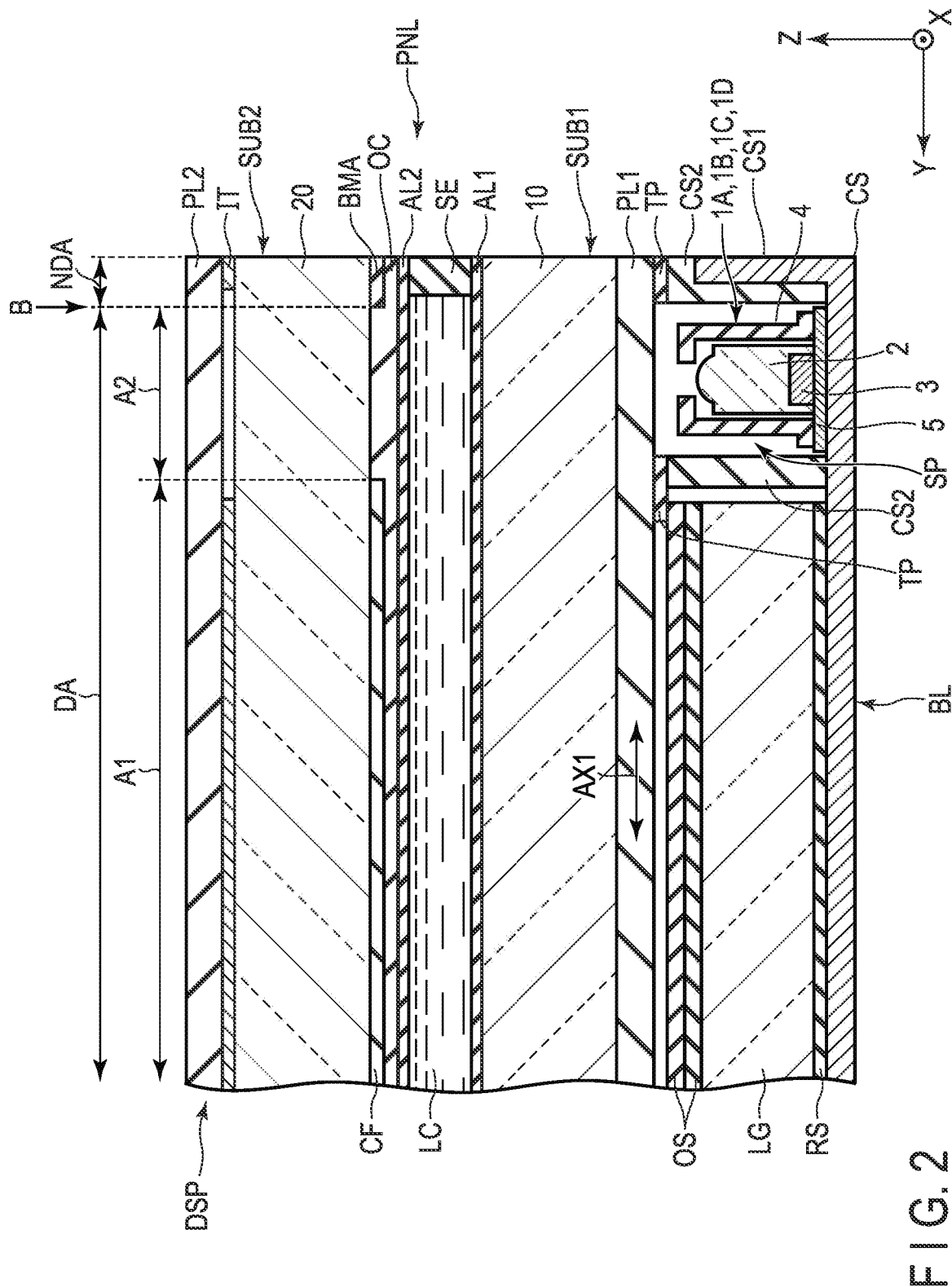
F I G. 2

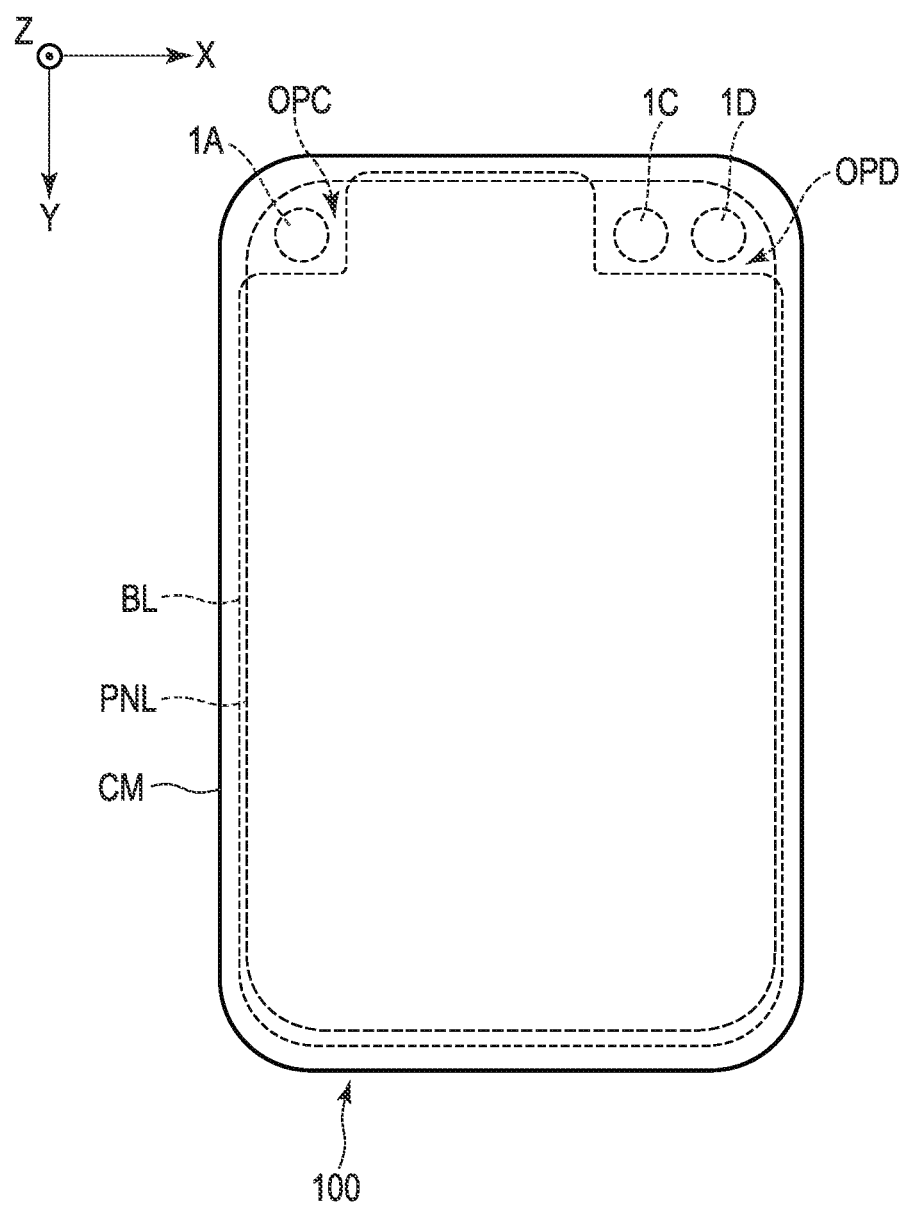
F I G. 10

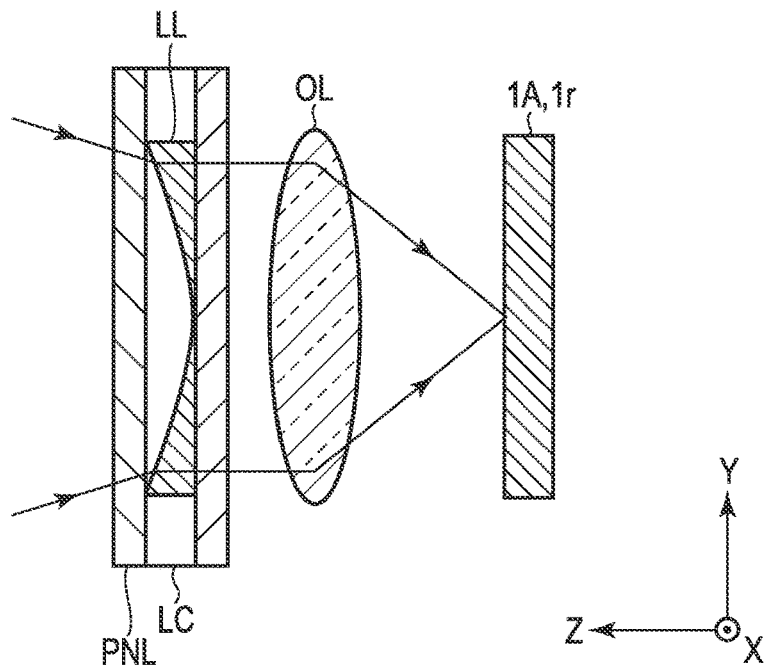
F I G. 17
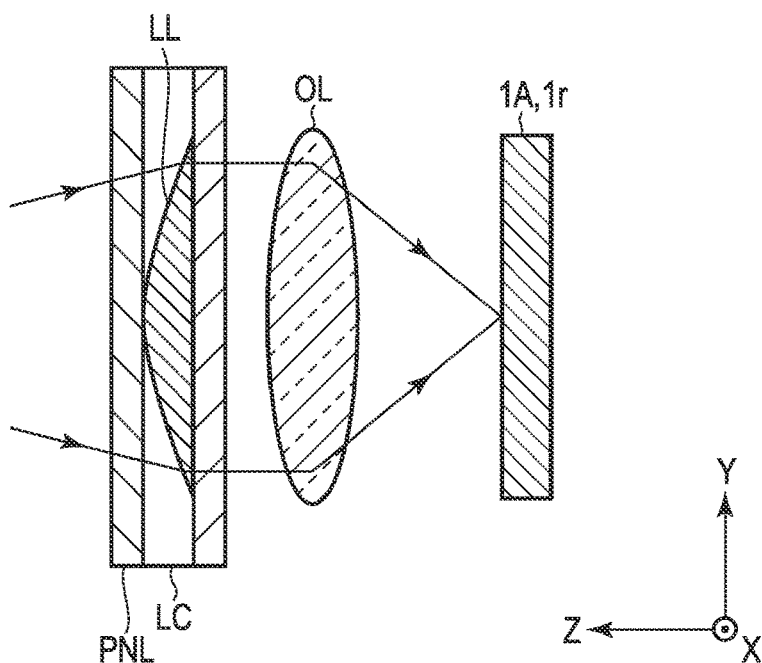
F I G. 18

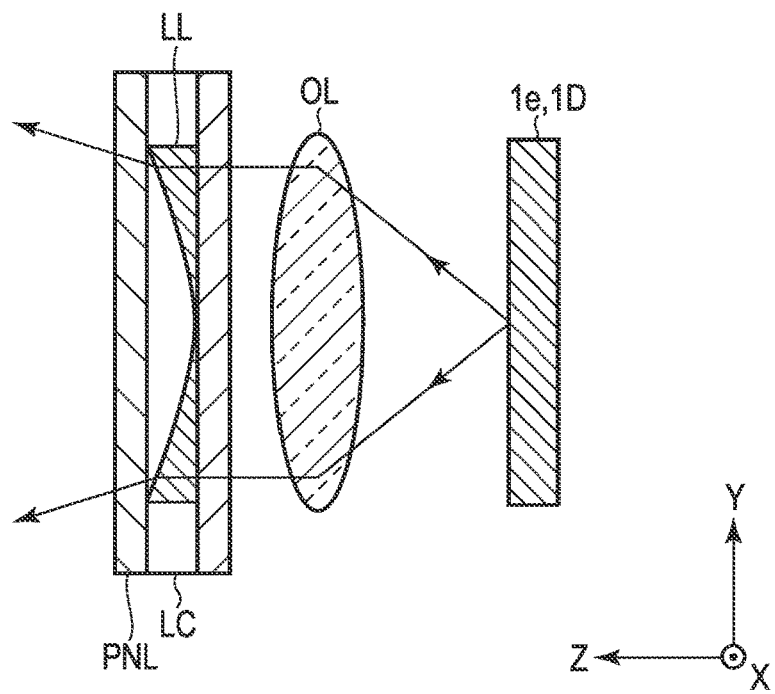
F I G. 19
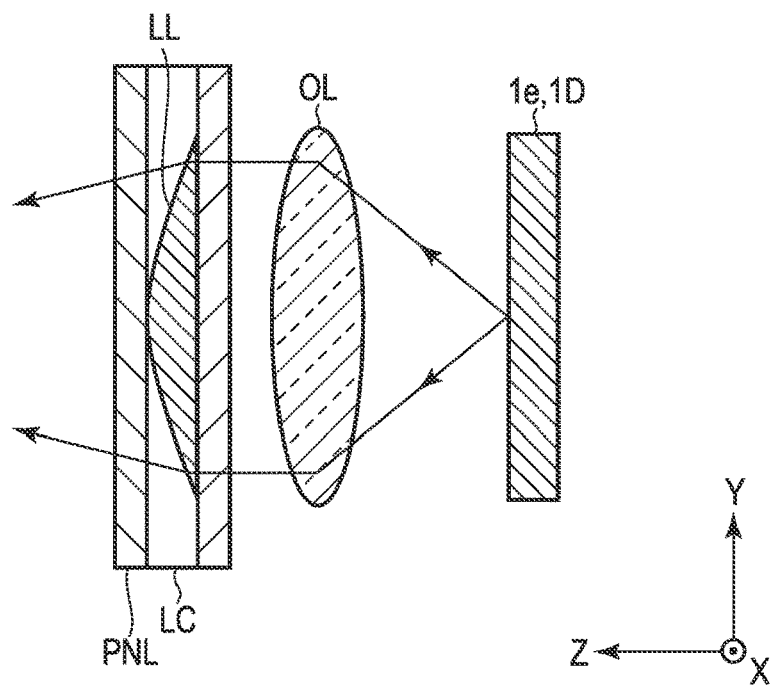
F I G. 20

DISPLAY DEVICE AND ELECTRONIC EQUIPMENT INCORPORATING THE DISPLAY DEVICE

CROSS-REFERENCE TO RELATED APPLICATIONS

This application is a Continuation of U.S. application Ser. No. 17/153,336 filed Jan. 20, 2021, which is a Continuation Application of PCT Application No. PCT/JP2019/020784, filed May 24, 2019 and based upon and claiming the benefit of priority from Japanese Patent Application No. 2018-137025, filed Jul. 20, 2018, the entire contents of all of which are incorporated herein by reference.

FIELD

Embodiments described herein relate generally to a display device and an electronic equipment incorporating the display device.

BACKGROUND

In recent years, an electronic equipment such as a smart phone including a display portion and a camera on the same surface has been widely put into practical use. In such an electronic equipment, a camera and the like are provided outside a display portion, and there is a growing demand that the display portion be enlarged while a space for providing the camera and the like is secured.

BRIEF DESCRIPTION OF THE DRAWINGS

FIG. 1 is an exploded perspective view showing an exemplary configuration of a display device DSP of an embodiment.

FIG. 2 is a sectional view including the display device DSP and a camera 1A shown in FIG. 1.

FIG. 10 is a plan view showing another exemplary configuration of the electronic equipment 100.

FIG. 17 is an illustration of an example of the liquid crystal panel PNL.

FIG. 18 is an illustration of another example of the liquid crystal panel PNL.

FIG. 19 is an illustration of another example of the liquid crystal panel PNL.

FIG. 20 is an illustration of another example of the liquid crystal panel PNL.

DETAILED DESCRIPTION

Figure 3:
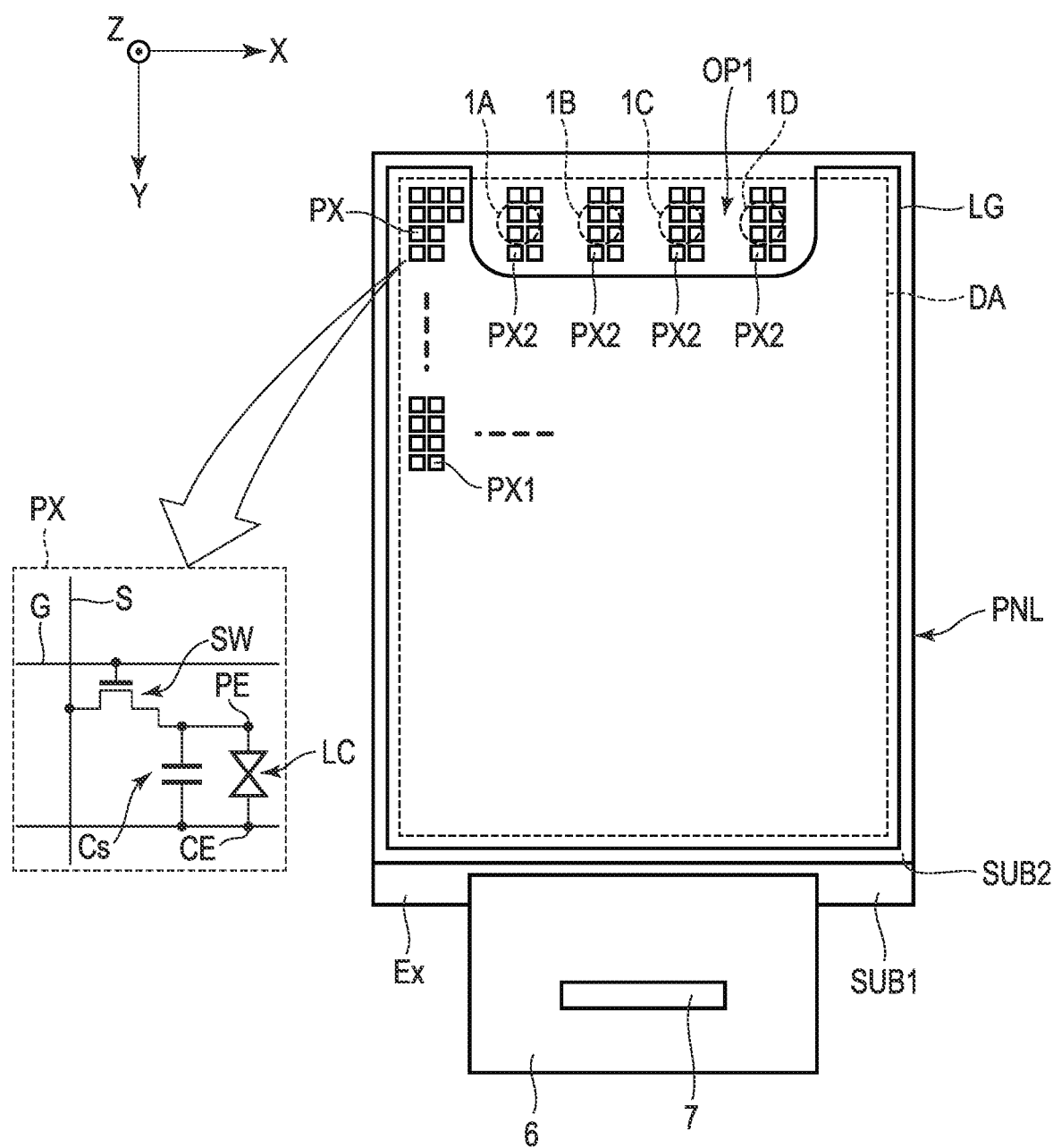
FIG. 3 is a plan view showing an exemplary configuration of a liquid crystal panel PNL and a light guide LG shown in FIG. 1.

In general, according to one embodiment, there is provided an electronic equipment comprising: a liquid crystal panel including a display portion; a polarizer superposed on the display portion; and a detection element superposed on the liquid crystal panel and the polarizer to detect infrared rays through the liquid crystal panel and the polarizer.

According to another embodiment, there is provided an electronic equipment comprising: a liquid crystal panel including a display portion; a polarizer superposed on the display portion; a detection element superposed on the liquid crystal panel and the polarizer to detect infrared rays through the liquid crystal panel and the polarizer; a light guide opposed to the liquid crystal panel; and a frame. The detection element is located between the light guide and the frame.

According to another embodiment, there is provided a display device comprising: a liquid crystal panel including a display portion; a polarizer superposed on the display portion; a light guide having a main surface opposed to the liquid crystal panel and an opening corresponding to one of a notch and a through hole. The display portion includes a first area and a second area which are superposed on the opening. The liquid crystal panel includes a color filter layer provided in the second area. The color filter layer is not provided in the first area.

Hereinafter, this embodiment will be described with reference to the drawings. It should be noted that the disclosure is merely an example, and those which can easily be conceived by a person skilled in the art as to appropriate changes while maintaining the gist of the invention are naturally included in the scope of the invention. Further, in order to clarify the description, the drawings may be schematically represented in terms of the width, thickness, shape, and the like of each portion as compared with the actual embodiment, but they are merely examples and are not intended to limit the interpretation of the present invention. Further, in the present specification and each of the figures, the same reference numerals are used to denote components that perform the same or similar functions as those described above with respect to the figures described above, and redundant detailed descriptions may be omitted as appropriate.

FIG. 1 is an exploded perspective view showing an exemplary configuration of a display device DSP of an embodiment. In this example, a first direction X, a second direction Y and a third direction Z are orthogonal to each other, but may intersect at an angle other than 90 degrees. The first and second directions X and Y correspond to a direction that is parallel to the main surface of a substrate that configures the display device DSP, and the third direction Z corresponds to a thickness direction of the display device DSP.

The display device DSP includes a first polarizer PL1, a second polarizer PL2, a liquid crystal panel PNL, optical sheets OS, a light guide LG, light sources EM and a reflective sheet RS. The reflective sheet RS, light guide LG, optical sheets OS, first polarizer PL1, liquid crystal panel PNL and second polarizer PL2 are arranged in this order along the third direction Z. The light sources EM are arranged at intervals along the first direction X. At least the light sources EM and light guide LG configure a backlight unit BL that illuminates the liquid crystal panel PNL from the back side. The backlight unit BL may further include an optical sheet OS and a reflective sheet RS. The first polarizer PL1, second polarizer PL2 and liquid crystal panel PNL configure a liquid crystal device LCD having an optical switching function for light traveling along the third direction Z. This liquid crystal device LCD exhibits a function of transmitting light or shielding light for each area in the X-Y plane defined by the first and second directions X and Y.

The liquid crystal panel PNL is formed like a flat plate that is parallel to the X-Y plane. Note that the liquid crystal panel PNL may be curved toward the third direction Z. The liquid crystal panel PNL includes a display portion DA that displays an image and a frame-shaped non-display portion NDA that surrounds the display portion DA. Though a detailed configuration of the liquid crystal panel PNL is not described here, the liquid crystal panel PNL may have any configuration corresponding to a display mode using a lateral electric field along a substrate main surface, a display mode using a longitudinal electric field along the normal of the substrate main surface, a display mode using an inclined electric field that is inclined in an oblique direction to the substrate main surface, and a display mode using an appropriate combination of the foregoing lateral electric field, longitudinal electric field and inclined electric field. The substrate main surface here is a plane that is parallel to the X-Y plane.

The liquid crystal panel PNL is located between the first and second polarizers PL1 and PL2. The first and second polarizers PL1 and PL2 are arranged on the liquid crystal panel PNL such that they are superposed at least on the display portion DA. In this example, the absorption axis AX1 of the first polarizer PL1 and the absorption axis AX2 of the second polarizer PL2 are orthogonal to each other in the X-Y plane.

The light guide LG has a first side surface Sa opposed to the light sources EM, a second side surface Sb that is the opposite side of the first side surface Sa, a main surface Sc opposed to the liquid crystal panel PNL, a main surface Sd that is the opposite side of the main surface Sc, and an opening OP1. Though the opening OP1 is provided on the opposite side of the first side surface Sa, it is not particularly limited but may be provided on the side surface that is orthogonal to the first side surface Sa. In the illustrated exemplary configuration, the opening OP1 corresponds to a recess portion or a notch which is recessed from the second side surface Sb toward the first side surface Sa. Note that the opening OP1 may be a through hole that penetrates the light guide LG in the third direction Z.

The optical sheets OS are located between the light guide LG and the liquid crystal panel PNL and opposed to the main surface Sc. Each of the optical sheets OS has an opening OP2 superposed on the opening OP1. The optical sheets OS are, for example, prism sheets and diffusion sheets.

The reflective sheet RS is opposed to the main surface Sd. That is, the light guide LG is located between the reflective sheet RS and the optical sheet OS. The reflective sheet RS has an opening OP3 superposed on the opening OP1. The reflective sheet RS may be fixed to a case made of metal, for example. In this case, the case may also have an opening superposed on the opening OP1.

The light sources EM are, for example, light emitting diodes (LED) to emit white illumination light. The illumination light emitted from the light sources EM enters from the first side surface Sa and travels inside the light guide LG. Then, the illumination light guided by the light guide LG is emitted from the main surface Sc toward the liquid crystal panel PNL to illuminate the liquid crystal panel PNL. The liquid crystal panel PNL, first polarizer PL1 and second polarizer PL2 selectively transmit the illumination light in the display portion DA to display an image.

Although an example in which light emitting diodes (LED) emitting white light are used as the light sources EM has been described so far, light emitting diodes (LED) emitting light of different emission colors such as red, blue and green may be used and arranged. In this case, it is also possible to use what is called a field sequential system which achieves color display by emitting light of respective colors from the light emitting diodes (LED) in sequence and accordingly switching the colors to be displayed in sequence. The use of the field sequential system makes it possible to achieve color display even in an area where no color filter layers are formed in the display portion DA.

The electronic equipment 100 incorporating the foregoing display device DSP includes a camera 1A, a proximity sensor 1B, a camera 1C for visible light, a projection element 1D and the like. The camera 1A, proximity sensor 1B, camera 1C and projection element 1D are arranged at intervals along the first direction X and superposed on the openings OP1 to OP3 in the third direction Z. The camera 1A, proximity sensor 1B, camera 1C and projection element 1D are also superposed on the liquid crystal panel PNL, first polarizer PL1 and second polarizer PL2 in the third direction Z. Some or all of the camera 1A, proximity sensor 1B, camera 1C and projection element 1D are superposed on the display portion DA of the liquid crystal panel PNL in the third direction Z.

The camera 1A corresponds to a detection element that detects infrared rays transmitted through the liquid crystal panel PNL and the first and second polarizers PL1 and PL2. The projection element 1D projects infrared rays toward the liquid crystal panel PNL and the first and second polarizers PL1 and PL2. For example, the projection element 1D projects infrared rays toward an object to be detected so as to form a plurality of dot-like patterns distributed on the X-Y plane. The camera 1A detects a dot pattern of infrared rays reflected from the object to be detected. A result of detection by the camera 1A can be used for authentication of the object to be detected and the like.

The proximity sensor 1B includes an infrared ray emitting unit 1e and an infrared ray receiving unit 1r. The infrared ray emitting unit 1e corresponds to a projection element that projects infrared rays toward an object to be detected through the liquid crystal panel PNL and the first and second polarizers PL1 and PL2. The infrared ray receiving unit 1r corresponds to a detection element that detects infrared rays reflected from an object to be detected through the liquid crystal panel PNL and the first and second polarizers PL1 and PL2. The proximity sensor 1B senses the proximity of an object to be detected.

The infrared ray emitting unit 1e of the proximity sensor 1B and the projection element 1D emit infrared rays having a peak wavelength in the range of, e.g. 900 nm to 1000 nm. On the other hand, the polarizers applied in the present embodiment transmit infrared rays in the range of 900 nm to 1000 nm regardless of their polarization states. The transmittance of infrared rays through the polarizers alone is preferably 80% or more. That is, the infrared rays projected from the infrared ray emitting unit 1e and the projection element 1D pass through the polarizers and reach an object to be detected. The infrared rays reflected by the object to be detected are transmitted through the polarizers and detected by the infrared ray receiving unit 1r and the camera 1A.

The camera 1C includes an image sensor (image pickup device) which receives light through the liquid crystal panel PNL and the first and second polarizers PL1 and PL2. The camera 1C receives visible light (for example, light in the range of 400 nm to 700 nm) transmitted through the liquid crystal panel PNL and the first and second polarizers PL1 and PL2. Assume that the absorption axis AX1 of the first polarizer PL1 and the absorption axis AX2 of the second polarizer PL2 are orthogonal to each other. When the wavelength of light transmitted through a liquid crystal layer LC of the liquid crystal device LCD is λ, if the retardation of the liquid crystal layer LC corresponds to almost zero or λ, the transmittance of the liquid crystal device LCD is minimized. Therefore, when a picture is taken by the camera 1C, the retardation of the liquid crystal layer LC is set larger than zero and smaller than λ. When the retardation is about λ/2, the transmittance of the liquid crystal device LCD becomes maximum.

FIG. 2 is a sectional view including the display device DSP and the camera 1A shown in FIG. 1. The liquid crystal panel PNL includes a first substrate SUB1, a second substrate SUB2, a liquid crystal layer LC and a sealant SE. The sealant SE is located at the non-display portion NDA to bond the first and second substrates SUB1 and SUB2 to each other and seal the liquid crystal layer LC.

The main parts of the first and second substrates SUB1 and SUB2 will be described below. The first substrate SUB1 includes a first insulating substrate 10 and an alignment film AL1. The second substrate SUB2 includes a second insulating substrate 20, a color filter layer CF, a light-shielding layer BMA, a transparent layer OC and an alignment film AL2.

The first and second insulating substrates 10 and 20 are transparent substrates such as glass substrates and flexible resin substrates. The alignment films AL1 and AL2 are in contact with the liquid crystal layer LC.

The color filter layer CF, light-shielding layer BMA and transparent layer OC are located between the second insulating substrate 20 and the liquid crystal layer LC.

The light-shielding layer BMA is located in the non-display portion NDA. The boundary B between the display portion DA and the non-display portion NDA is defined by, for example, the inner end of the light-shielding layer BMA (an end portion thereof alongside the display portion DA). The sealant SE is provided at a position where it is superposed on the light-shielding layer BMA.

The color filter layer CF is not described in detail here. For example, the color filter layer CF includes a red colored filter placed on red pixels, a green colored filter placed on green pixels and a blue colored filter placed on blue pixels. The color filter layer CF may also include a transparent resin layer placed on white pixels.

The transparent layer OC covers the color filter layer CF and the light-shielding layer BMA. The transparent layer OC is, for example, a transparent organic insulating film.

The display portion DA includes an area A1 in which the color filter layer CF and the light-shielding layer BMA are arranged and an area A2 in which neither the color filter layer CF nor the light-shielding layer BMA is arranged. The transparent layer OC is arranged formed over the areas A1 and A2, and is in contact with the color filter layer CF in the area A1 and is in contact with the second insulating substrate 20 in the area A2. Paying attention to a positional relationship between the illustrated camera 1A and display portion DA, the camera 1A is superposed on the area A2. In other words, neither the color filter layer CF nor the light-shielding layer BMA is superposed on the camera 1A. In addition, the alignment films AL1 and AL2 are provided over the areas A1 and A2.

Like the camera 1A, the proximity sensor 1B, camera 1C for visible light and projection element 1D are superposed on the area A2 and not superposed on the color filter layer CF or the light-shielding layer BMA. Note that the camera 1A, proximity sensor 1B and projection element 1D may be superposed on the area A1. In this case, the camera 1A, proximity sensor 1B and projection element 1D may be superposed on the light-shielding layer BMA in which one or both of the color filter CF and the light-shielding layer BMA which is formed in a grating or stripe pattern. When the camera 1A, proximity sensor 1B and projection element 1D are superposed on the area A1, the color filter layer CF may be provided with the same transparent resin layer as that formed on the white pixels.

The first polarizer PL1 is bonded to the first insulating substrate 10. The second polarizer PL2 is bonded to the second insulating substrate 20. The first and second polarizers PL1 and PL2 are arranged over the areas A1 and A2. Note the first and second polarizers PL1 and PL2 may include a retardation film, a scattering layer, an antireflective layer, and the like. Between the second polarizer PL2 and the second insulating substrate 20, a transparent conductive film IT may be formed to prevent the liquid crystal layer LC from being influenced by an electric field or the like. The transparent conductive coating IT is formed of a transparent oxide conductor such as ITO and IZO. If an area that is superposed on the camera 1A, proximity sensor 1B and projection element 1D is provided with an area where the transparent conductive film IT is not formed, the transmittance of infrared rays can be prevented from decreasing. The area where the transparent conductive film IT is not formed can be made larger than the area A2. The transparent conductive film IT can be formed in a portion that is superposed on the camera 1C for visible light in which there is no problem with low transmittance of infrared rays. If a conductive resin whose infrared ray transmittance is higher than that of the oxide conductor is used as the transparent conductive film IT, an area that is superposed on the camera 1A, proximity sensor 1B and projection element 1D can be provided with the transparent conductive film IT.

For example, the second polarizer PL2 or the first polarizer PL1 can be provided with a super retardation film. It is known that the super retardation film makes transmitted light unpolarized light (natural light) when linear polarized light enters the film, and it makes it possible to take a picture of a subject without feeling strange even though the subject contains something that emits polarized light. For example, when a liquid crystal display device is reflected by a subject of the camera 1C, it emits linear polarized light. It is thus likely to vary the brightness of the liquid crystal display device for a subject that is incident upon the camera 1C by the relation of the first polarizer PL1, the second polarizer PL2, and the angles between polarizers and the liquid crystal display device, and cause a user to feel strange when photographing. If, however, the second polarizer PL2 or the first polarizer PL1 is provided with a super retardation film, the brightness that causes a user to feel strange can be prevented from varying.

For example, Cosmoshine (registered trademark) of Toyobo Co., Ltd. is preferably used as the super retardation film. The super retardation film is a film whose retardation is 800 nm or more in the in-plane direction with respect to light in a visible range of, e.g. 550 nm.

In addition, the polarizer PL1 may include a reflective layer that reflects polarization components of illumination light from the backlight unit BL, which are parallel to the absorption axis AX1, toward the backlight unit BL. When the polarizer PL1 is applied, some of the infrared rays emitted from the infrared ray emitting unit 1e of the proximity sensor 1B and the projection element 1D, are reflected by the reflective layer and accordingly the light use efficiency is decreased. It is also likely that the light reflected by the reflective layer enters the camera 1A, proximity sensor 1B and camera 1C and has an adverse influence thereon. It is therefore preferable that the reflective layer should be removed from the polarizer PL1 in an area that is superposed on the camera 1A, proximity sensor 1B, camera 1C and projection element 1D.

In order to reuse the light emitted from the infrared ray emitting unit 1e of the proximity sensor 1B and the projection element 1D and then reflected by the reflective layer, a reflective layer that reflects the arriving light may be provided inside or around the proximity sensor 1B and the projection element 1D.

The optical sheets OS, light guide LG, reflective sheet RS and light sources EM (not shown) are housed in the case CS. The case CS includes a metal case CS1 and a resin case CS2. The gap between the case CS2 and the optical sheet OS is shielded from light by a light-shielding tape TP. In addition, the first polarizer PL1 and the case CS2 are bonded to each other by the light-shielding tape TP.

The camera 1A, proximity sensor 1B, camera 1C and projection element 1D are housed in space SP surrounded by the case CS2. This space SP is located below the liquid crystal panel PNL and formed inside the openings OP1 to OP3 shown in FIG. 1.

The camera 1A includes, for example, an optical system 2 including at least one lens, an infrared sensor 3 and a case 4. The case 4 houses the optical system 2 and the infrared sensor 3. The optical system 2 is located between the liquid crystal panel PNL and the infrared sensor 3. The camera 1A is electrically connected to a wiring substrate 5.

Note that the camera 1A and the like need not always be provided in space SP of the backlight unit BL. That is, when the case CS has an opening to be superposed on the space SP, the camera 1A and the like may be provided outside the case CS and superposed on the opening of the case CS. In any case, the camera 1A and the like have only to be provided at a position where they are superposed on the opening OP1 in the third direction Z. That is, in the electronic equipment including the liquid crystal panel PNL and the camera 1A, the camera 1A has only to be provided behind the liquid crystal panel PNL as viewed from the user of the electronic equipment.

According to the present embodiment, the camera 1A, proximity sensor 1B, camera 1C and projection element 1D are superposed on the liquid crystal panel PNL. Furthermore, according to the present embodiment, the camera 1A, proximity sensor 1B, camera 1C and projection element 1D are superposed on the display portion DA of the liquid crystal panel PNL. The display portion DA can thus be enlarged.

In addition, any space need not be provided to place the camera 1A and the like in the non-display portion NDA. Therefore, the frame width of the non-display portion NDA can be reduced as compared with the case where the camera 1A and the like are superposed on the non-display portion NDA.

The first and second polarizers PL1 and PL2 have high transmittance to infrared rays. Therefore, although the camera 1A and the infrared ray receiving unit 1r of the proximity sensor 1B are superposed on the first and second polarizers PL1 and PL2, the detection accuracy of infrared rays to be detected by the camera 1A and the infrared ray receiving unit 1r can be prevented from decreasing. In addition, although the infrared ray emitting unit 1e of the proximity sensor 1B and the projection element 1D are superposed on the first and second polarizers PL1 and PL2, the irradiation amount of infrared rays emitted from the infrared ray emitting unit 1e and the projection element 1D can be prevented from decreasing.

If the camera 1C for visible light is not superposed on the color filter layer CF or the light-shielding film BMA, the visible light incident upon the camera 1C through the liquid crystal panel PNL is not affected by the color filter layer CF or the light-shielding film BMA. It is thus possible to suppress undesired absorption and coloring by the color filter layer CF.

If the infrared ray emitting unit 1e or the projection element 1D is not superposed on the color filter layer CF, it is possible to prevent the color filter layer CF from absorbing infrared rays emitted from the infrared ray emitting unit 1e and the projection element 1D.

If the camera 1A or the infrared ray receiving unit 1r is not superposed on the color filter layer CF, it is possible to prevent the color filter layer CF from absorbing infrared rays to be detected by the camera 1A and the infrared ray receiving unit 1r.

As described above, the camera 1A and the infrared ray receiving unit 1r may be superposed on the color filter layer CF.

For example, when the color filter layer CF includes a red-colored filter, a green-colored filter and a blue-colored filter, the red-colored filter may be formed of a material that transmits infrared rays. In this case, visible light is absorbed by the color filter layer CF, and the camera 1A and the infrared ray receiving unit 1r can detect infrared rays that transmit through the color filter layer CF. That is, the color filter layer CF functions as a filter that absorbs visible light.

Similarly, when the color filter layer CF includes a transparent resin layer for white pixels as well as a red-colored filter, a green-colored filter and a blue colored filter, the color filter layer CF functions as a filter that absorbing visible light, and the camera 1A and the infrared ray receiving unit 1r can detect infrared rays transmitted through the transparent resin layer. When the red-colored filter is formed of a material transmitting infrared rays, the camera 1A and the infrared ray receiving unit 1r can detect the infrared rays transmitted through the transparent resin layer and the red-colored filter. In any case, of the light transmitted through the red-colored filter, the light having the wavelength transmitted through the first polarizer PL1 is detected by the camera 1A and the infrared ray receiving unit 1r.

In the example shown in FIG. 2, the color filter layer CF is provided on the second substrate SUB2, but may be provided on the first substrate SUB1.

FIG. 3 is a plan view showing an exemplary configuration of the liquid crystal panel PNL and light guide LG shown in FIG. 1. The display portion DA is located in a region on which the first and second substrates SUB1 and SUB2 are superposed. In the illustrated exemplary configuration, the display portion DA is a substantially quadrangular area that does not include a notch, but its four corners may be rounded. Similarly, the outer shape of the liquid crystal panel PNL is substantially quadrangle, but its four corners may be rounded, and the liquid crystal panel PNL may be polygonal or circular other than quadrangle.

The liquid crystal panel PNL includes pixels PX arranged in a matrix in the first and second directions X and Y in the display portion DA. The pixels PX in the display portion DA have the same circuit configuration. As enlarged and shown in FIG. 3, each of the pixels PX includes a switching element SW, a pixel electrode PE, a common electrode CE, a liquid crystal layer LC and the like. The switching element SW is configured by, for example, a thin film transistor (TFT) and is electrically connected to a scanning line G and a signal line S. The scanning line G is supplied with a control signal to control the switching element SW. The signal line S is supplied with a video signal as a signal other than the control signal. The pixel electrode PE is electrically connected to the switching element SW. The pixel electrode PE is opposed to the common electrode CE to drive the liquid crystal layer LC by an electric field generated between the pixel electrode PE and the common electrode CE. The capacitor Cs is formed, for example, between an electrode having the same potential as that of the common electrode CE and an electrode having the same potential as that of the pixel electrode PE.

A wiring substrate 6 is electrically connected to an extended portion Ex of the first substrate SUB1. An IC chip 7 is electrically connected to the wiring substrate 6. Note that the IC chip 7 may be electrically connected to the extended portion Ex. The IC chip 7 includes, for example, a display driver that outputs signals necessary for image display. The wiring substrate 6 is a bendable, flexible printed circuit.

In the display portion DA, the pixels PX1, which are not superposed on the camera 1A, proximity sensor 1B, camera 1C or projection element 1D, correspond to the pixels in the area A1 shown in FIG. 2, and include the color filter layer CF. That is, the pixels PX1 can display any one of red, green and blue colors. When the pixels PX1 are white pixels, they can display any one of white (or transparency), gray and black. The pixels PX1 are arranged over the entire area superposed on the light guide LG in the display portion DA. In addition, the pixels PX1 may be arranged in an area which is not superposed on the camera 1A and the like and which is included in an area superposed on the opening OP1 of the light guide LG.

In the display portion DA, the pixels PX2, which are superposed on the camera 1A, proximity sensor 1B, camera 1C and projection element 1D, correspond to the pixels in the area A2 shown in FIG. 2, and do not include the color filter layer CF. That is, the pixels PX2 are monochrome display pixels and can display any one of white (or transparency), gray and black. In FIG. 3, the outline of the camera 1A and the like is indicated by dashed lines, which show the pixels PX2 superposed on the camera 1A and the like. Ideally, the pixels PX2 overlap the optical system 2 including a lens of the camera 1A and the like in planar view, but may overlap the case 4 of the camera 1A and the like.

The pixels PX2 may be arranged over the entire area superposed on the opening OP1 in the display portion DA. The pixels PX2 may also be arranged in an area superposed on the light guide LG, or may be arranged over the entire band-shaped area including the opening OP1 and extended in the first direction X.

Figure 4:
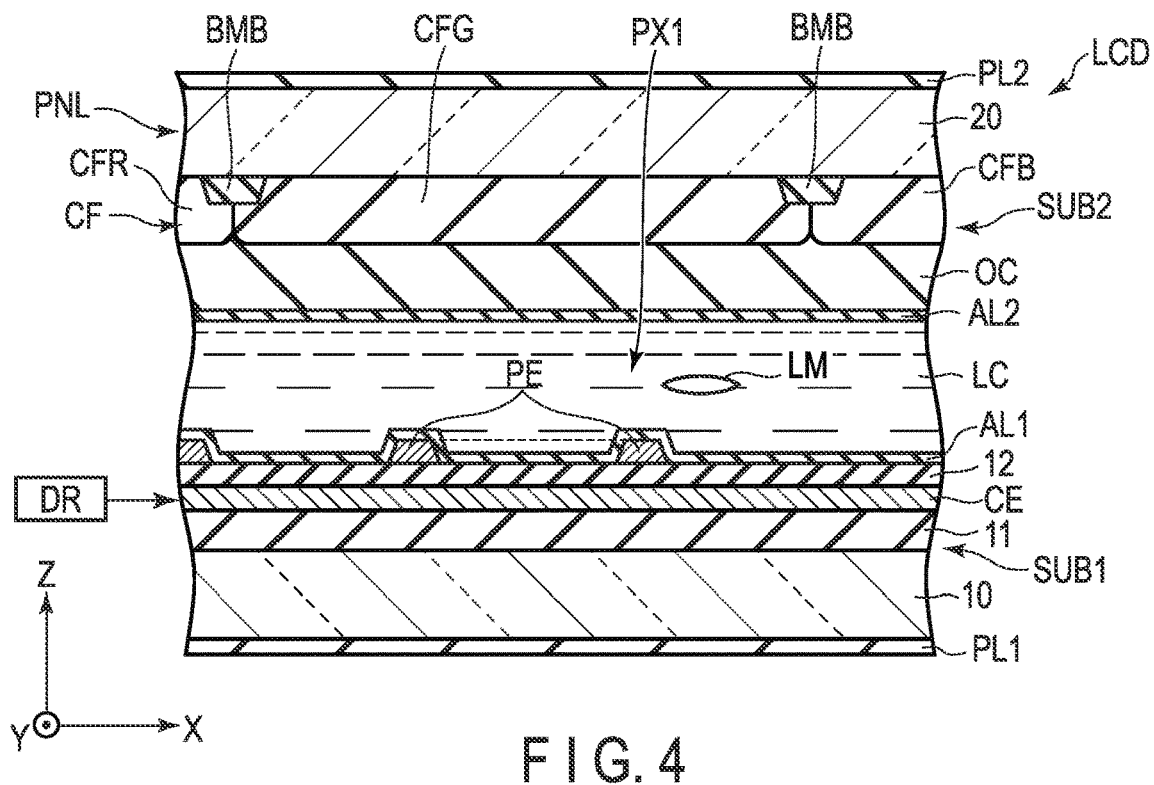
FIG. 4 is a sectional view of a liquid crystal device LCD including pixels PX1 shown in FIG. 3.

FIG. 4 is a sectional view of the liquid crystal device LCD including pixels PX1 shown in FIG. 3. Here is a description of a liquid crystal device LCD in which a liquid crystal panel PNL corresponding to a display mode using a lateral electric field is interposed between the first and second polarizers PL1 and PL2.

The first substrate SUB1 includes insulating films 11 and 12, a common electrode CE and a pixel electrode PE between the first insulating substrate 10 and the alignment film AL1. The scanning line G, signal line S and switching element SW shown in FIG. 3 are, for example, located between the first insulating substrate 10 and the common electrode CE. The common electrode CE is located on the insulating film 11 and covered with the insulating film 12. The pixel electrode PE is located on the insulating film 12 and covered with the alignment film AL1. The pixel electrode PE is opposed to the common electrode CE through the insulating film 12. The common electrode CE and pixel electrode PE are formed of a transparent conductive material such as indium tin oxide (ITO) and indium zinc oxide (IZO). The pixel electrode PE is a linear electrode, and the common electrode CE is a planar electrode which is common to the pixels PX1 and which is provided over them. Note that the pixel electrode PE may be a planar electrode, and a linear common electrode may be provided between the pixel electrode PE and the liquid crystal layer LC. Though not described in detail, the insulating film 11 includes an inorganic insulating film and an organic insulating film. The insulating film 12 is, for example, an inorganic insulating film such as silicon nitride.

In the second substrate SUB2, the light-shielding layer BMB is formed integrally with the light-shielding layer BMA of the non-display portion NDA shown in FIG. 2. The color filter layer CF includes a red colored filter CFR, a green colored filter CFG and a blue colored filter CFB. The green colored filter CFG is opposed to the pixel electrode PE. The red colored filter CFR and the blue colored filter CFB are also opposed to other pixel electrodes PE (not shown), respectively.

The driver DR that drives the liquid crystal device LCD includes, for example, a scanning line driving circuit electrically connected to the scanning line G shown in FIG. 3 and a signal line driving circuit electrically connected to the signal line S. The driver DR outputs a signal necessary for image display to each of the pixels PX of the display portion DA to control the transmittance of the liquid crystal device LCD. The transmittance of the liquid crystal device LCD is controlled in accordance with the magnitude of the voltage applied to the liquid crystal layer LC.

For example, in the pixel PX1 in the OFF state where no voltage is applied to the liquid crystal layer LC, liquid crystal molecules LM contained in the liquid crystal layer LC are initially aligned in a predetermined direction between the alignment films AL1 and AL2. In this OFF state, the light guided to the pixel PX1 from the light source EM shown in FIG. 1 is absorbed by the first and second polarizers PL1 and PL2. The liquid crystal device LCD thus displays black in the pixel PX1 in the OFF state.

On the other hand, in the ON state where a voltage is applied to the liquid crystal layer LC, the liquid crystal molecules LM are aligned in a direction different from the initial alignment direction by an electric field formed between the pixel electrode PE and the common electrode CE, and the alignment direction is controlled by the electric field. In this ON state, part of the light guided to the pixel PX1 passes through the first and second polarizers PL1 and PL2. In the ON-state pixel PX1, therefore, the liquid crystal device LCD displays a color corresponding to the color filter layer CF.

The foregoing example corresponds to what is called a normally-black mode in which black is displayed in the OFF state, but a normally-white mode in which black is displayed in the ON state (white is displayed in the OFF state) may be applied.

Figure 5:
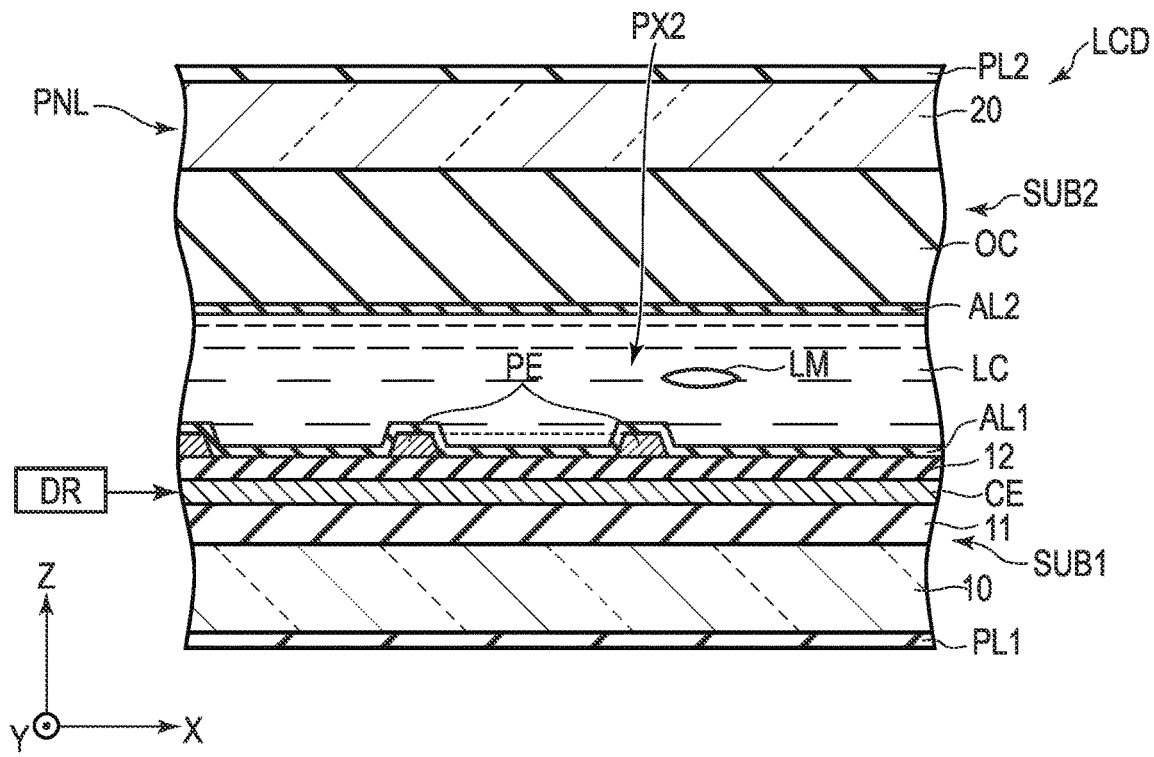
FIG. 5 is a sectional view of a liquid crystal device LCD including pixels PX2 shown in FIG. 3.

FIG. 5 is a sectional view of the liquid crystal device LCD including the pixels PX2 shown in FIG. 3. The pixels PX2 differ from the pixel PX1 shown in FIG. 4 in that the second substrate SUB2 does not include the color filter layer CF or the light-shielding layer BMB. That is, the transparent layer OC is in contact with the second insulating substrate 20 immediately above the pixel electrode PE. In order to adjust the thickness of the transparent layer OC, a transparent resin layer may be provided between the transparent layer OC and the second insulating substrate 20.

The transmittance of the liquid crystal device LCD in the pixels PX2 is controlled by the driver DR in the same manner as the pixel PX1. That is, the liquid crystal device LCD has the minimum transmittance in the pixels PX2 in the OFF state where no voltage is applied to the liquid crystal layer LC, and displays black in the same manner as the pixel PX1.

On the other hand, in the ON state where a voltage is applied to the liquid crystal layer LC, part of the light guided to the pixels PX2 passes through the first and second polarizers PL1 and PL2. The liquid crystal device LCD displays white or is in a transparent state when it has the maximum transmittance in the ON-state pixels PX2. Further, as described above, the liquid crystal device LCD is controlled to have an intermediate transmittance between the minimum transmittance and the maximum transmittance, and may display gray. Although the common electrode CE is shaped like a flat plate in FIG. 5, the pixel PX2 may be configured to have an opening in the common electrode CE. When the pixel electrode PE is disposed closer to the insulating substrate than the common electrode CE, an opening may be formed in the pixel electrode PE. Furthermore, the pixel electrode PE and the common electrode CE may be formed as linear electrodes. In this case, the linear pixel electrode PE and the linear common electrode CE can be provided in the same layer. The pixel electrode PE and the common electrode CE can also be provided in different layers via an insulating film. When a liquid crystal lens is formed using the liquid crystal layer LC, the degree of freedom of lens characteristics can be more enhanced when the lens is formed by the linear pixel electrode PE and the linear common electrode CE than when the lens is formed by a planar electrode and a linear electrode.

Figure 6:
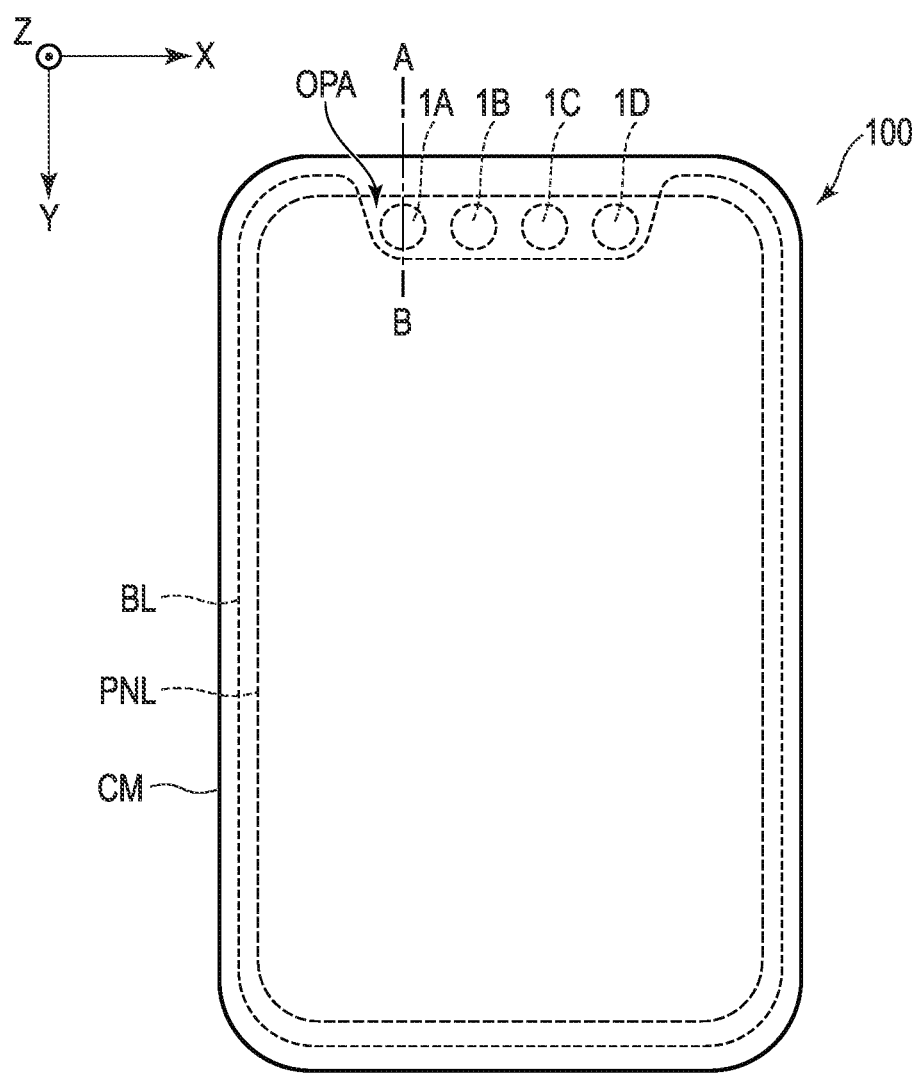
FIG. 6 is a plan view showing an exemplary configuration of an electronic equipment 100.

FIG. 6 is a plan view showing an exemplary configuration of the electronic equipment 100. The backlight unit BL has one opening OPA corresponding to a notch. The camera 1A, proximity sensor 1B, camera 1C and projection element 1D are provided in an opening OPA of the backlight unit BL.

The liquid crystal panel PNL is superposed on the backlight unit BL. The liquid crystal panel PNL is superposed on the camera 1A, proximity sensor 1B, camera 1C and projection element 1D. A cover CM, which is one of the housings of the electronic equipment, is transparent and is a glass substrate or a resin substrate. The cover CM is superposed on the liquid crystal panel PNL.

Figure 7:
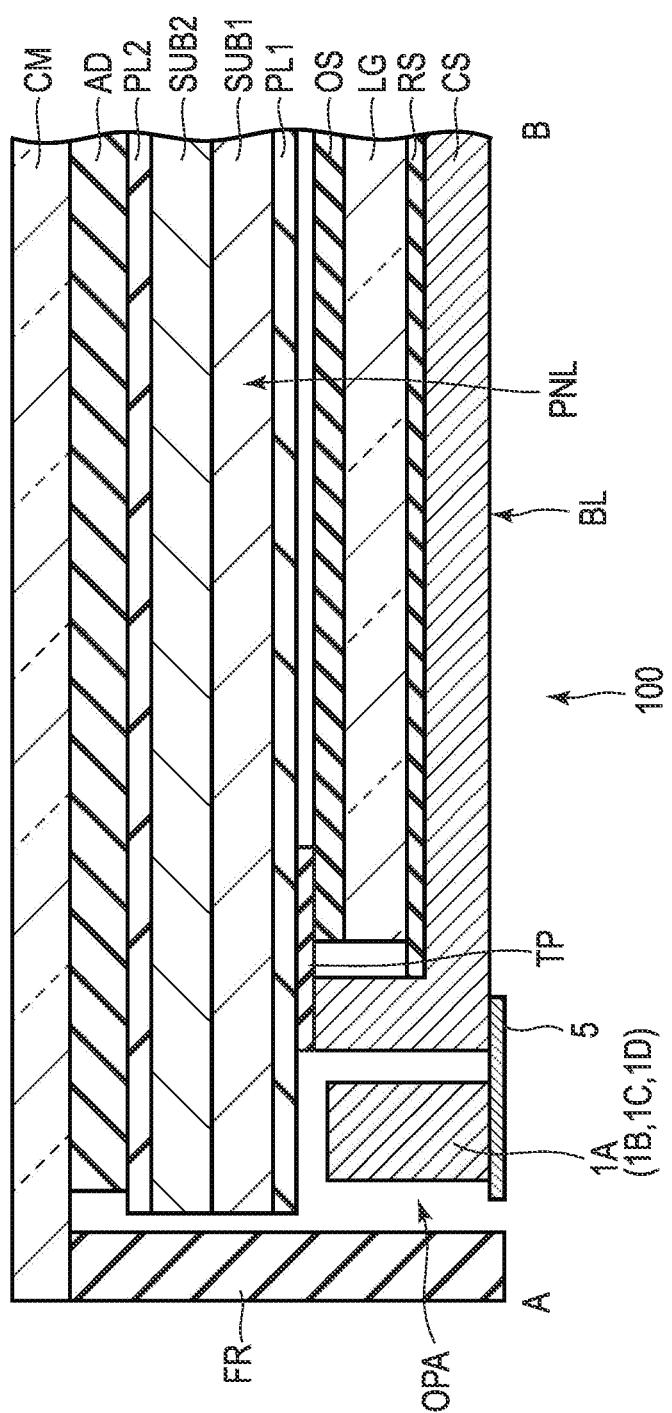
FIG. 7 is a sectional view taken along line A-B, including a camera 1A of the electronic equipment 100 shown in FIG. 6.

FIG. 7 is a sectional view taken along line A-B, including the camera 1A of the electronic equipment 100 shown in FIG. 6. Adhesive resin AD is transparent and is provided between the second polarizer PL2 and the cover CM. The cover CM is fixed to a frame FR of the electronic equipment 100.

The opening OPA corresponds to a space between the frame FR and the case CS of the backlight unit BL in the illustrated sectional view. The camera 1A is located between the frame FR and the case CS. The proximity sensor 1B, camera 1C and projection element 1D (none of which is shown) are also located between the frame FR and the case CS.

Figure 8:
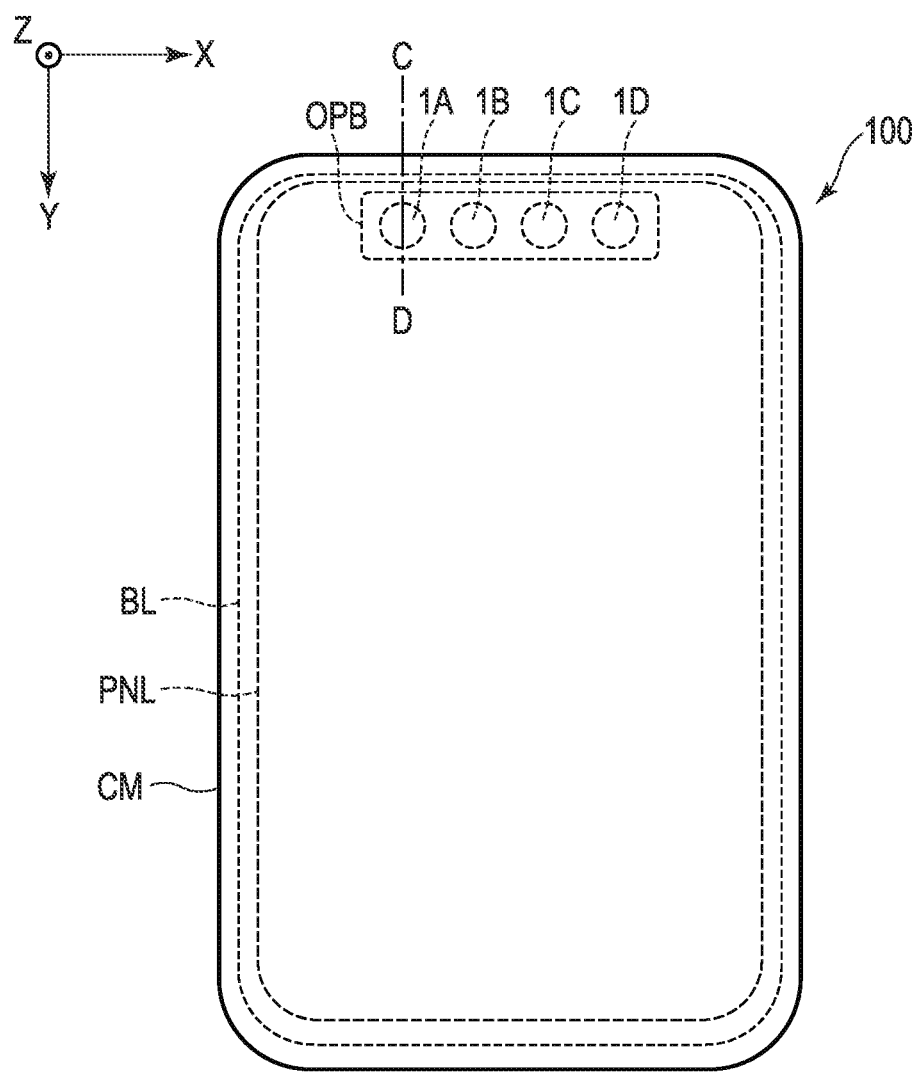
FIG. 8 is a plan view showing another exemplary configuration of the electronic equipment 100.

FIG. 8 is a plan view showing another exemplary configuration of the electronic equipment 100. The exemplary configuration shown in FIG. 8 differs from that shown in FIG. 6 in that the backlight unit BL has one opening OPB corresponding to a through hole. The camera 1A, proximity sensor 1B, camera 1C and projection element 1D are provided in the opening OPB.

Figure 9:
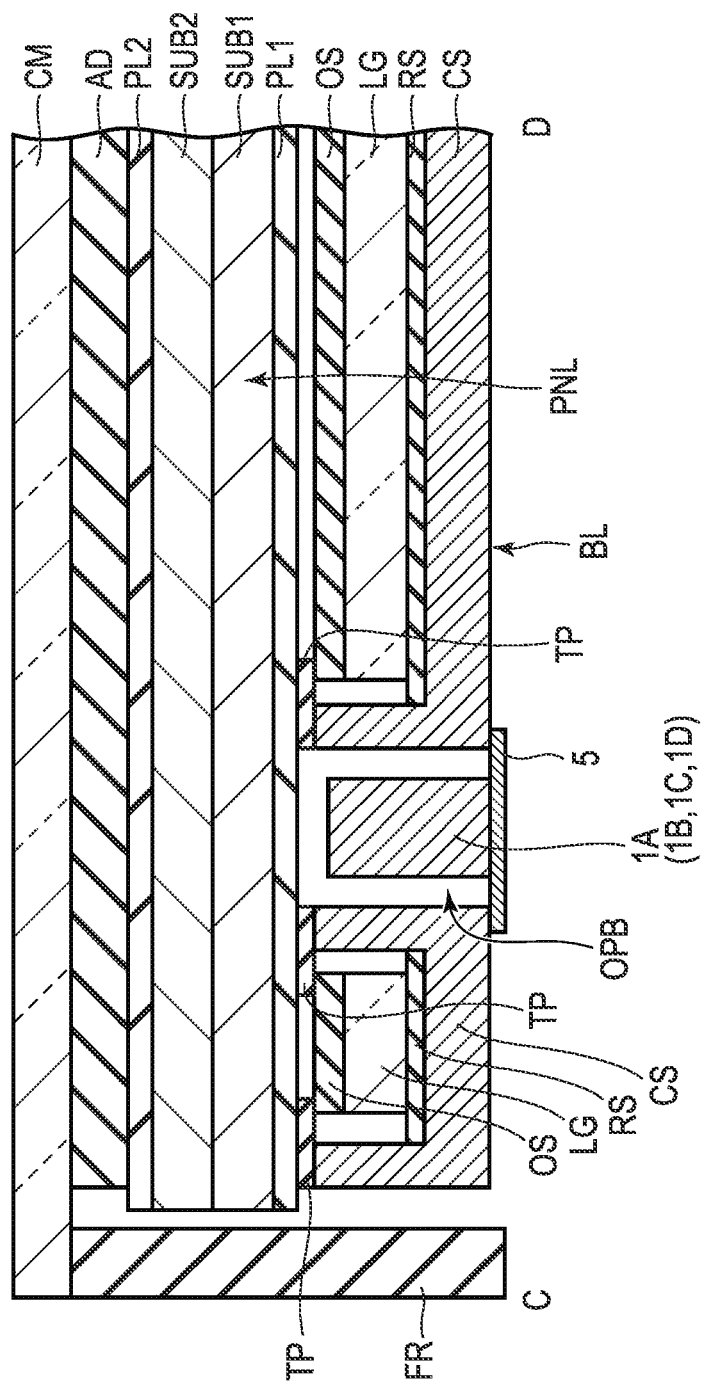
FIG. 9 is a sectional view taken along line C-D, including a camera 1A of the electronic equipment 100 shown in FIG. 8.

FIG. 9 is a sectional view taken along line C-D, including the camera 1A of the electronic equipment 100 shown in FIG. 8. The opening OPB provided with the camera 1A and the like corresponds to a space formed through the optical sheet OS, light guide LG, reflective sheet RS and case CS of the backlight unit BL in the illustrated sectional view. Between the camera 1A or the like and the frame FR, part of each of the case CS, reflective sheet RS, light guide LG and optical sheet OS is located.

FIG. 10 is a plan view showing another exemplary configuration of the electronic equipment 100. The exemplary configuration shown in FIG. 10 differs from that shown in FIG. 6 in that the backlight unit BL has two openings OPC and OPD corresponding to notches. The opening OPC is formed at one end of the backlight unit BL, and the opening OPD is formed at the other end of the backlight unit BL.

The camera 1A for infrared rays is provided in the opening OPC. The projection element 1D is provided in the opening OPD. The camera 1C for visible light is located between the camera 1A and the projection element 1D. In the illustrated exemplary configuration, the camera 1C is provided in the opening OPD together with the projection element 1D, but may be provided in the opening OPC together with the camera 1A. Between the openings OPC and OPD, the backlight unit BL and the liquid crystal panel PNL are superposed.

In the foregoing exemplary configuration, the camera 1A and the projection element 1D are arranged at a large interval along the first direction X as compared with the case where the camera 1A and the projection element 1D are arranged close to each other. It is thus possible to increase the incident angle of infrared rays projected from the projection element 1D toward an object to be detected and the reflection angle of infrared rays reflected from the object to be detected toward the camera 1A.

Figure 11:
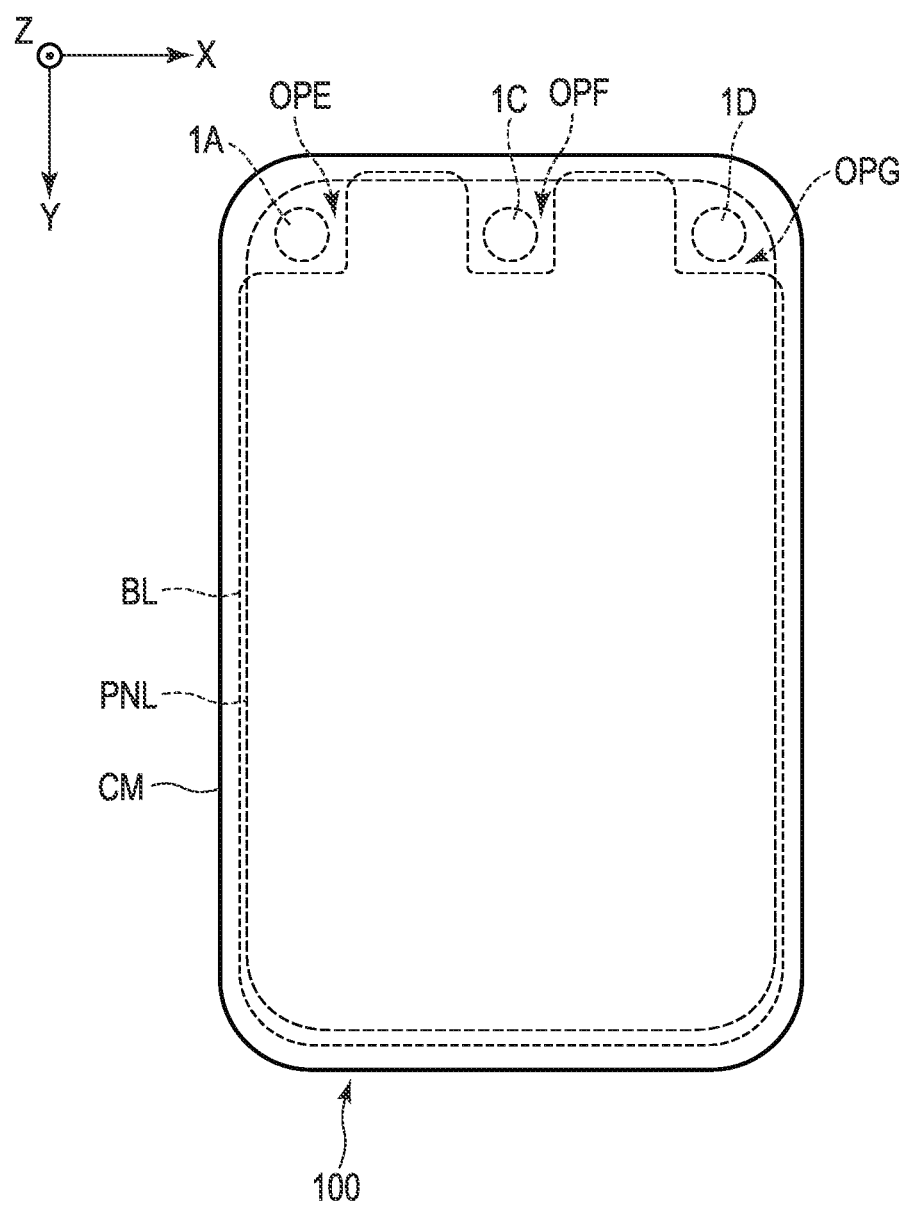
FIG. 11 is a plan view showing another exemplary configuration of the electronic equipment 100.

FIG. 11 is a plan view showing another exemplary configuration of the electronic equipment 100. The exemplary configuration shown in FIG. 11 differs from that shown in FIG. 6 in that the backlight unit BL has three openings OPE, OPF and OPG corresponding to notches. The opening OPE is formed at one end of the backlight unit BL, the opening OPG is formed at the other end of the backlight unit BL, and the opening OPF is formed between the openings OPE and OPG.

The camera 1A for infrared rays is provided in the opening OPE. The camera 1C for visible light is provided in the opening OPF. The projection element 1D is provided in the opening OPG. The backlight unit BL and the liquid crystal panel PNL are superposed between the openings OPE and OPF and between the openings OPF and OPG.

Figure 12:
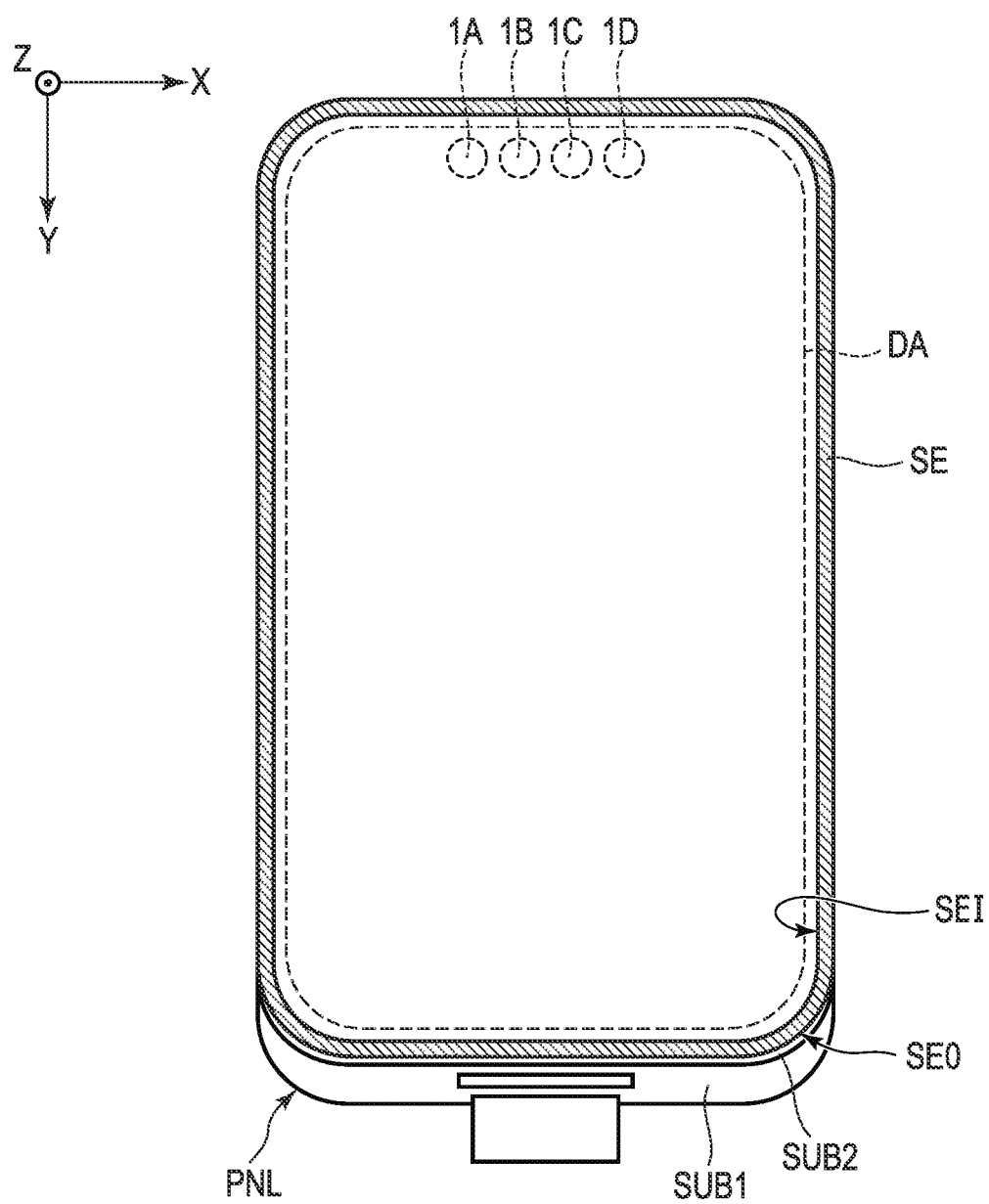
FIG. 12 is a plan view showing an exemplary configuration of a liquid crystal panel PNL shown in FIGS. 6 to 11.

FIG. 12 is a plan view showing an exemplary configuration of the liquid crystal panel PNL shown in FIGS. 6 to 11. The first and second substrates SUB1 and SUB2 are bonded together by a loop-shaped sealant SE. The outer end SEO of the sealant SE is along the edge of the second substrate SUB2. The display portion DA is located in the inside surrounded by the sealant SE.

In planar view, the camera 1A, proximity sensor 1B, camera 1C and projection element 1D are located inside the inner end SEI of the sealant SE and separated from the inner end SEI.

Figure 13:
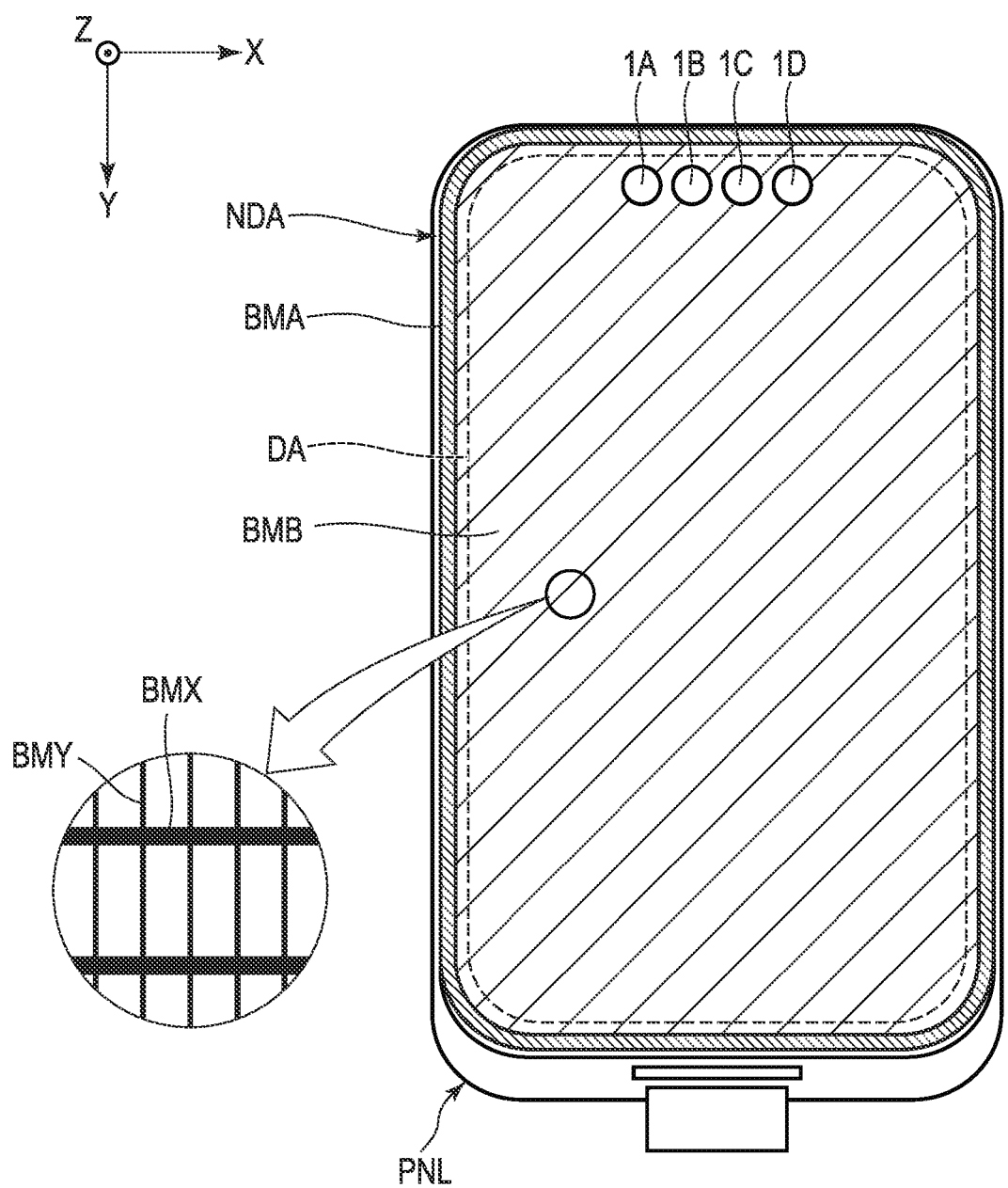
FIG. 13 is a plan view illustrating a positional relationship among a light-shielding layer, a camera 1A, etc. in the liquid crystal panel PNL shown in FIG. 12.

FIG. 13 is a plan view illustrating a positional relationship between the light-shielding layer and the camera 1A and the like in the liquid crystal panel PNL shown in FIG. 12. The light-shielding layer BMA located in the non-display portion NDA is superposed on the sealant SE shown in FIG. 12 and formed like a loop.

The light-shielding layers BMB located in the display portion DA are formed in a grating pattern, for example, and includes a portion BMX extended in the first direction X and a portion BMY extended in the second direction Y. Note that it is assumed that the portion BMY extends in the second direction Y even though its part is bent.

In planar view, the camera 1A, proximity sensor 1B, camera 1C and projection element 1D are superposed on the display portion DA, not on the light-shielding layer BMB. That is, neither of the portions BMX and BMY is formed in an area on which the camera 1A, proximity sensor 1B, camera 1C and projection element 1D are superposed. However, one of the portions BMX and BMY may be formed. In addition, the width of at least one of the portions BMX and BMY may be thinner than that of the other portion.

Figure 14:
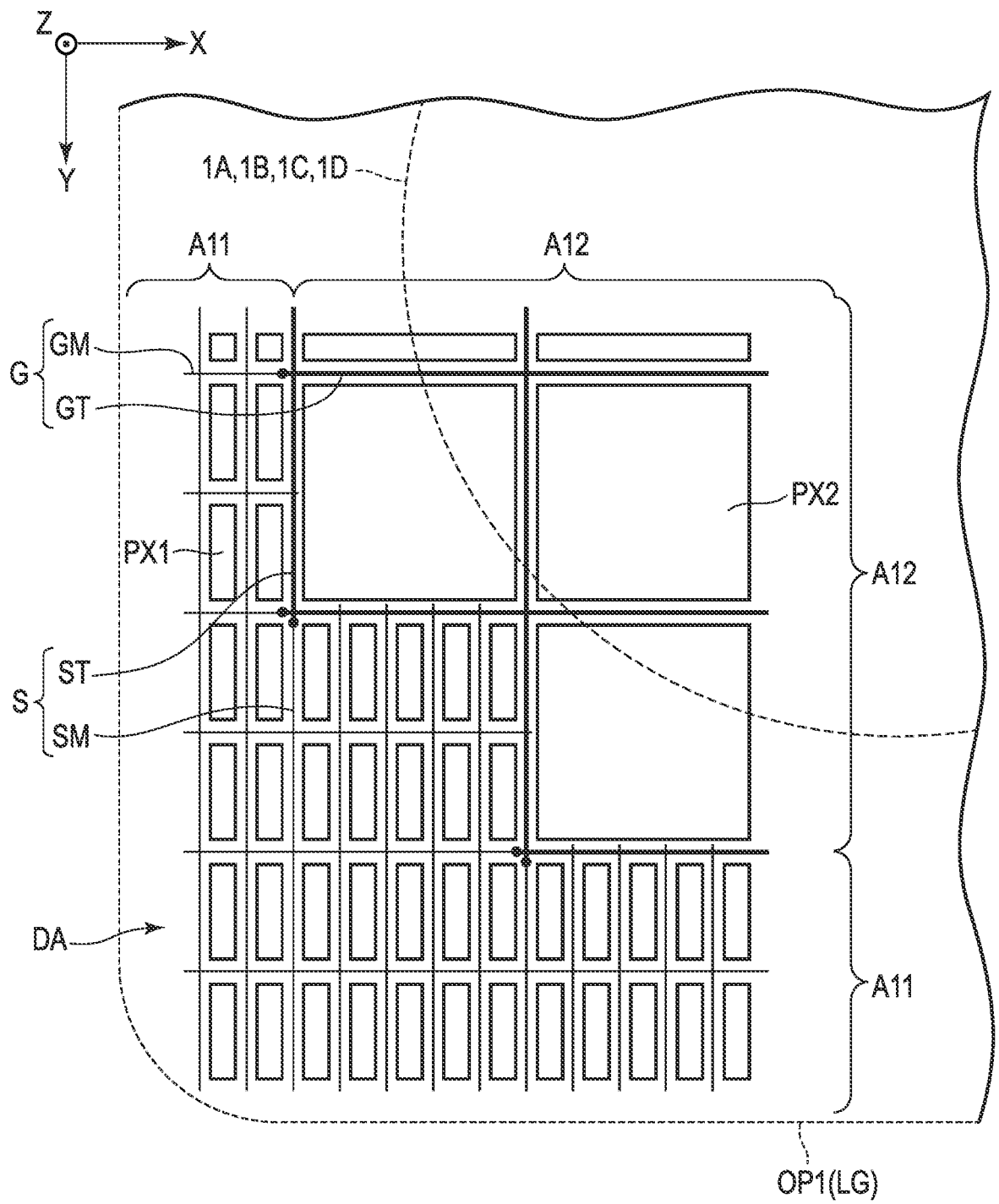
FIG. 14 is a plan view showing an example of the layout of pixels PX1 and PX2.

FIG. 14 is a plan view showing an example of the layout of the pixels PX1 and PX2. The display portion DA includes a first area A11 and a second area A12. The first and second areas A11 and A12 are superposed on the opening OP1 of the light guide LG. In planar view, the camera 1A, proximity sensor 1B, camera 1C and projection element 1D are superposed on the second area A12.

Each of the pixels PX1 in the first area A11 includes a color filter layer CF and a light-shielding layer BMB, as described with reference to FIG. 4 and the like. Each of the pixels PX2 in the second area A12 includes neither a color filter layer CF nor a light-shielding layer BMB, as described with reference to FIG. 5 and the like. In the illustrated example, each pixel PX2 is larger than each pixel PX1, but they may have the same size. In addition, the pixel PX1 is shaped like a rectangle extending in the second direction Y and the pixel PX2 is almost a square, but the pixels PX1 and PX2 are not limited to these shapes. For example, the pixels PX1 and PX2 may be formed like a polygon such as a parallelogram, a circle, and a fan, and may be bent.

The scanning line G, which is placed across the first and second areas A11 and A12, includes a first metal wiring line GM and a first transparent wiring line GT. The first metal wiring line GM is placed in the first area A11, and the first transparent wiring line GT is placed in the second area A12. The first metal wiring line GM and the first transparent wiring line GT extend in the first direction X and are electrically connected to each other.

The signal line S, which is placed across the first and second areas A11 and A12, includes a second metal wiring line SM and a second transparent wiring line ST. The second metal wiring line SM is placed in the first area A11, and the second transparent wiring line ST is placed in the second area A12. The second metal wiring line SM and the second transparent wiring line ST extend in the second direction Y and are electrically connected to each other.

The first and second metal wiring lines GM and SM are formed of metal materials such as molybdenum, tungsten, aluminum and titanium. The first and second transparent wiring lines GT and ST are formed of transparent conductive materials such as ITO and IZO.

From the viewpoints of improving the transmittance of the second area A12 and suppressing diffraction of light transmitted through the second area A12, it is desirable that neither of the first and second metal wiring lines GM and SM is placed in the second area A12. Alternatively, when the light transmitted through the second area A12 is required to be diffracted, the first and second metal wiring lines GM and SM may be placed in the second area A12, instead of the first and second transparent wiring lines GT and ST.

Figure 15:
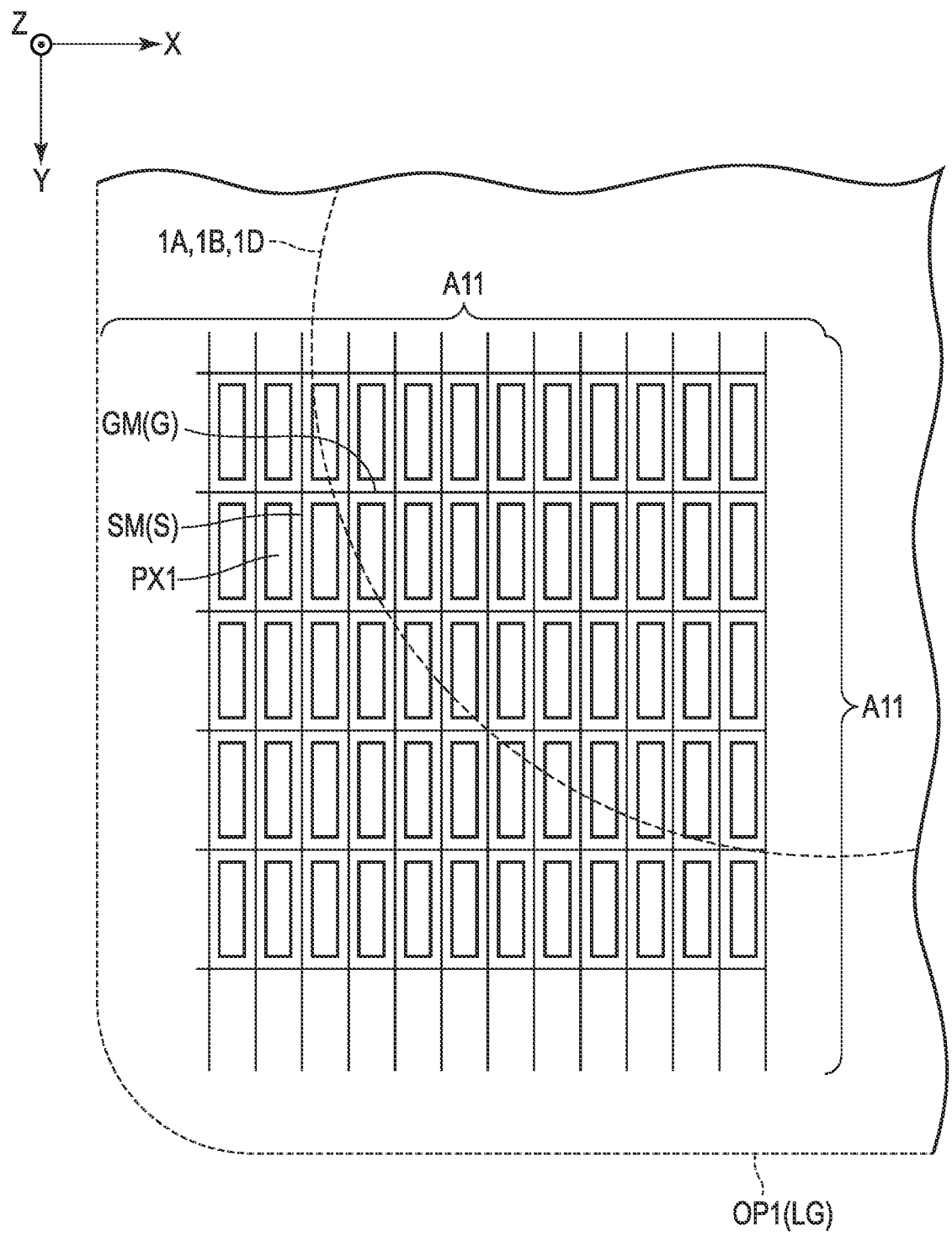
FIG. 15 is a plan view showing another example of the layout of the pixels PX1.

FIG. 15 is a plan view showing another example of the layout of the pixels PX1. The example shown in FIG. 15 differs from the example shown in FIG. 14 in that the camera 1A, proximity sensor 1B and projection element 1D are superposed on the first area A11 in planar view. That is, the camera 1A, proximity sensor 1B and projection element 1D are superposed on the same pixels PX1 as the other pixels in the display portion DA, and are superposed on the color filter layer CF and the light-shielding layer BMB. The camera 1A, proximity sensor 1B and projection element 1D are also superposed on the first and second metal wiring lines GM and SM.

For example, in response to a request to diffract infrared rays emitted from the projection element 1D, in the first area A11 on which the projection element 1D is superposed, the first and second metal wiring lines GM and SM are arranged in a grating pattern and thus function as a diffraction grating. Note that the same diffraction grating can be formed by the grating-like light-shielding layers BMB described with reference to FIG. 13.

Figure 16:
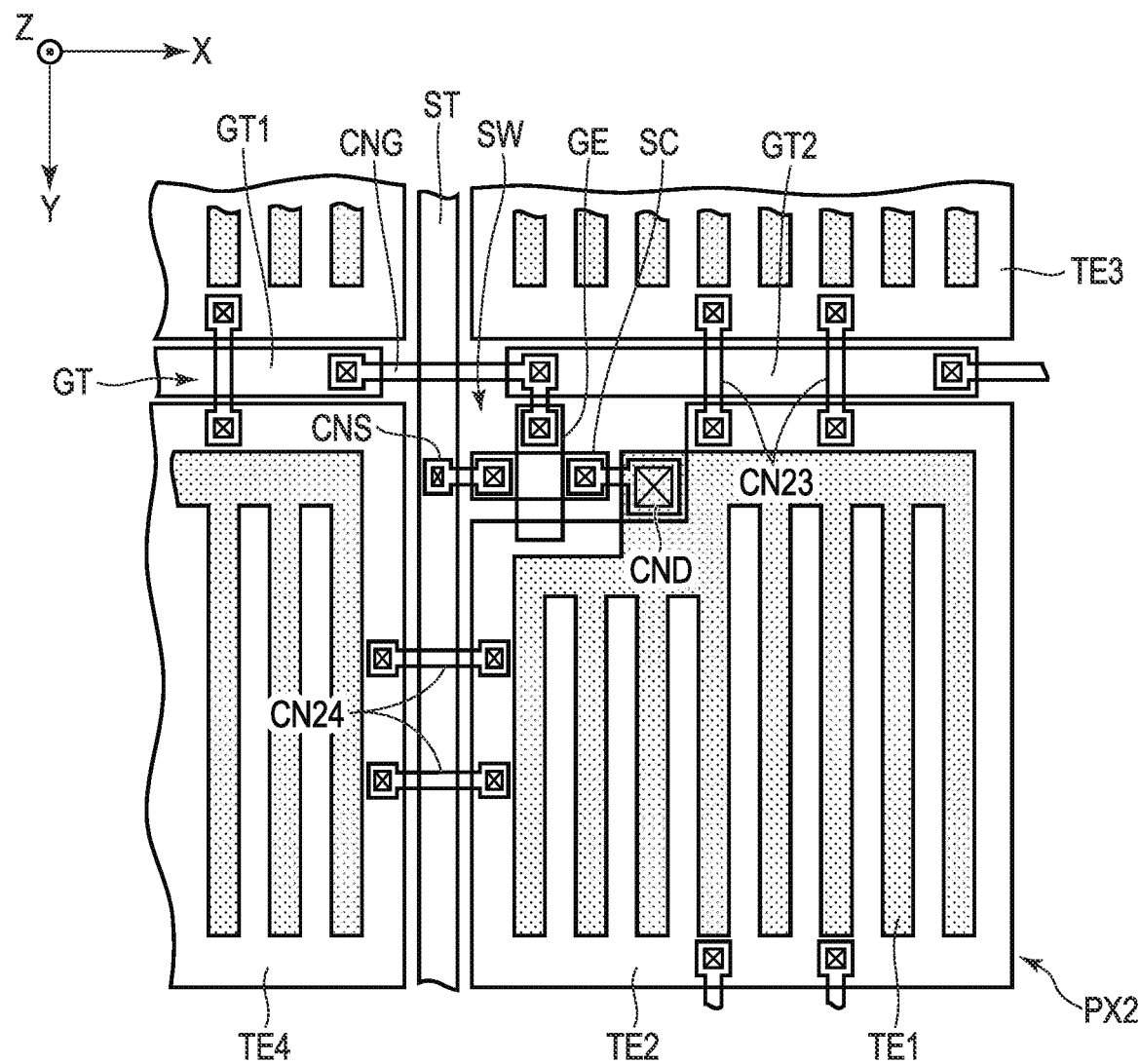
FIG. 16 is a plan view showing an exemplary configuration of the pixels PX2 shown in FIG. 14.

FIG. 16 is a plan view showing an exemplary configuration of the pixels PX2 shown in FIG. 14.

In the pixels PX2, the switching element SW is electrically connected to the first and second transparent wiring lines GT and ST. The switching element SW includes a semiconductor layer SC. The semiconductor layer SC is, for example, a transparent semiconductor layer containing indium, gallium and the like. Note that The semiconductor layer SC may be polycrystalline silicon and amorphous silicon.

A first transparent electrode TE1 is electrically connected to the switching element SW. A second transparent electrode TE2 is opposed to the first transparent electrodes TE1. The first and second transparent electrodes TE1 and TE2 are formed of transparent conductive materials such as ITO and IZO. In the sectional view of the first substrate SUB1 in the pixels PX2 shown in FIG. 5, the first transparent electrode TE1 corresponds to the pixel electrode PE, the second transparent electrode TE2 corresponds to the common electrode CE, and the insulating film 12 is interposed between the first and second transparent electrodes TE1 and TE2.

The first and second transparent wiring lines GT and ST are, for example, located in the same layer as the second transparent electrode TE2 and are formed of the same material as the second transparent electrode TE2. The first transparent wiring line GT has a first portion GT1 and a second portion GT2 which are separated from the second transparent wiring line ST without intersecting the second transparent wiring line ST. The first and second portions GT1 and GT2 are electrically connected by a connection electrode CNG that intersects the second transparent wiring line ST. The connection electrode CNG is formed of a conductive material located in a layer other than the second transparent wiring line ST. For example, the connection electrode CNG is formed of a metal material located in the same layer as the first metal wiring line GM or the second metal wiring line SM. Alternatively, the connection electrode CNG is formed of a metal material or a transparent conductive material located in a layer other than the first metal wiring line GM and the second metal wiring line SM.

When an organic insulating film is interposed between the connection electrode CNG and the first transparent wiring line GT, a contact hole for connecting the connection electrode CNG and the first transparent wiring line GT tends to be deep and large in diameter. Thus, when no organic insulating film is disposed between the connection electrode CNG and the first transparent wiring line GT, the connection electrode CNG and the first transparent wiring line GT can electrically be connected through a small contact hole.

Note that the first and second transparent wiring lines GT and ST may be located in the same layer as the first transparent electrode TE1. Alternatively, the first transparent wiring line GT and the first transparent electrode TE1 may be located in the same layer, and the second transparent wiring line ST and the second transparent electrode TE2 may be located in the same layer. In this case, since an insulating film is interposed between the first and second transparent wiring lines GT and ST, the first and second transparent wiring lines GT and ST can be formed continuously without disconnection, and no connection electrode is required.

Paying attention to the switching element SW, the gate electrode GE that intersects the semiconductor layer SC is electrically connected to the first transparent wiring line GT by the connection electrode CNG. The semiconductor layer SC is electrically connected to the second transparent wiring line ST by the connection electrode CNS and is electrically connected to the first transparent electrode TE1 by the connection electrode CND.

The second and third transparent electrodes TE2 and TE3 are arranged at intervals in the second direction Y. The first transparent wiring line GT is located between the second and third transparent electrodes TE2 and TE3. The connection electrode CN23 intersects the first transparent wiring line GT and electrically connects the second and third transparent electrodes TE2 and TE3.

The second and fourth transparent electrodes TE2 and TE4 are arranged at intervals in the first direction X. The second transparent wiring line ST is located between the second and fourth transparent electrodes TE2 and TE4. The connection electrode CN24 intersects the second transparent wiring line ST and electrically connects the second and fourth transparent electrodes TE2 and TE4.

The foregoing pixel PX2 can be improved in transmittance, as compared with the pixel PX1 in which metal wiring lines are arranged.

FIG. 17 is an illustration of an example of the liquid crystal panel PNL. The liquid crystal panel PNL is so configured that a liquid crystal lens LL is formed in the liquid crystal layer LC in an area superposed on the camera 1A and the infrared ray receiving unit 1r. The liquid crystal lens LL may be a spherical lens or an aspherical lens. This liquid crystal lens LL is formed, for example, by controlling the alignment state of liquid crystal molecules in the liquid crystal layer LC or the refractive index distribution of the liquid crystal layer LC. In the illustrated example, the liquid crystal lens LL is a concave lens that refracts infrared rays in a desired direction. It is thus possible to detect infrared rays in a wider range.

Note that the optical lens OL in the figure may be the optical system 2 built in the camera 1A shown in FIG. 2 or may be a lens provided between the camera 1A and the liquid crystal panel PNL.

FIG. 18 is an illustration of another example of the liquid crystal panel PNL. The example shown in FIG. 18 differs from the example shown in FIG. 17 in that the liquid crystal lens LL is a convex lens. If the focal length of the liquid crystal lens LL is varied, the dot pattern of infrared rays reflected from an object to be detected can be detected with accuracy even though the object to be detected includes irregularities in the third direction Z.

FIG. 19 is an illustration of another example of the liquid crystal panel PNL. The liquid crystal panel PNL is so configured that a liquid crystal lens LL is formed in the liquid crystal layer LC in an area superposed on the infrared ray emitting unit 1e and the projection element 1D. The liquid crystal lens LL is a concave lens similar to that shown in FIG. 17. It is thus possible to project infrared rays over a wider range.

FIG. 20 is an illustration of another example of the liquid crystal panel PNL. The example shown in FIG. 20 differs from the example shown in FIG. 19 in that the liquid crystal lens LL is a convex lens. It is thus possible to focus and project infrared rays on a desired area.

Figure 21:
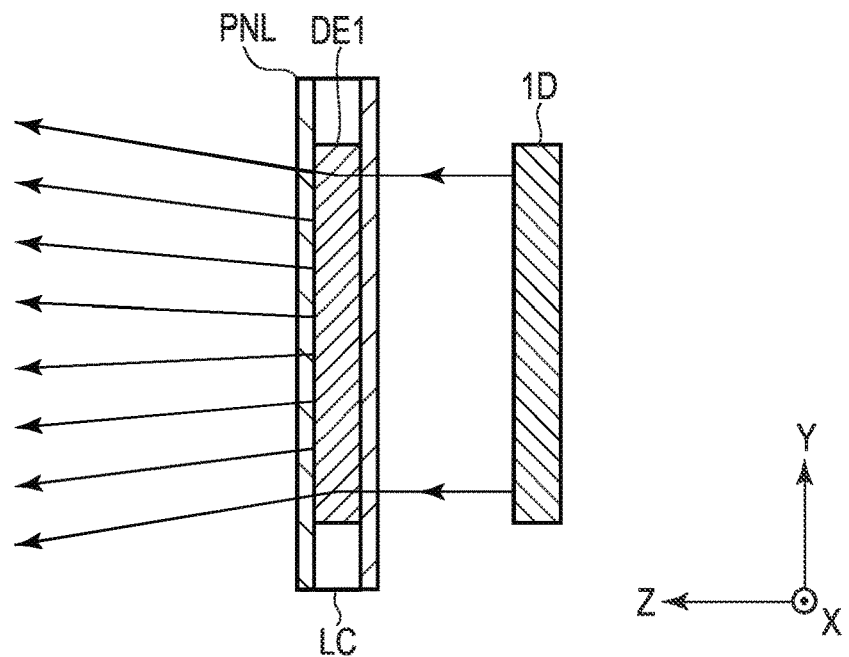
FIG. 21 is an illustration of another example of the liquid crystal panel PNL.

FIG. 21 is an illustration of another example of the liquid crystal panel PNL. The liquid crystal panel PNL includes a diffractive optical element DE1 in the liquid crystal layer LC in an area superposed on the projection element 1D. The diffractive optical element DE1 is formed of, for example, a grating-like light-shielding layer BMB as described with reference to FIG. 13 or grating-like first and second metal wiring lines GM and SM as described with reference to FIG. 15. Note that the diffractive optical element DE1 is not limited to the above as long as it diffracts infrared rays.

The projection element 1D is, for example, a vertical cavity surface emitting laser (VCSEL) to emit infrared rays that spread in the X-Y plane. The diffractive optical element DE1 diffracts the infrared rays emitted from the projection element 1D. It is thus possible to form a plurality of dot-like patterns distributed in the X-Y plane.

Figure 22:
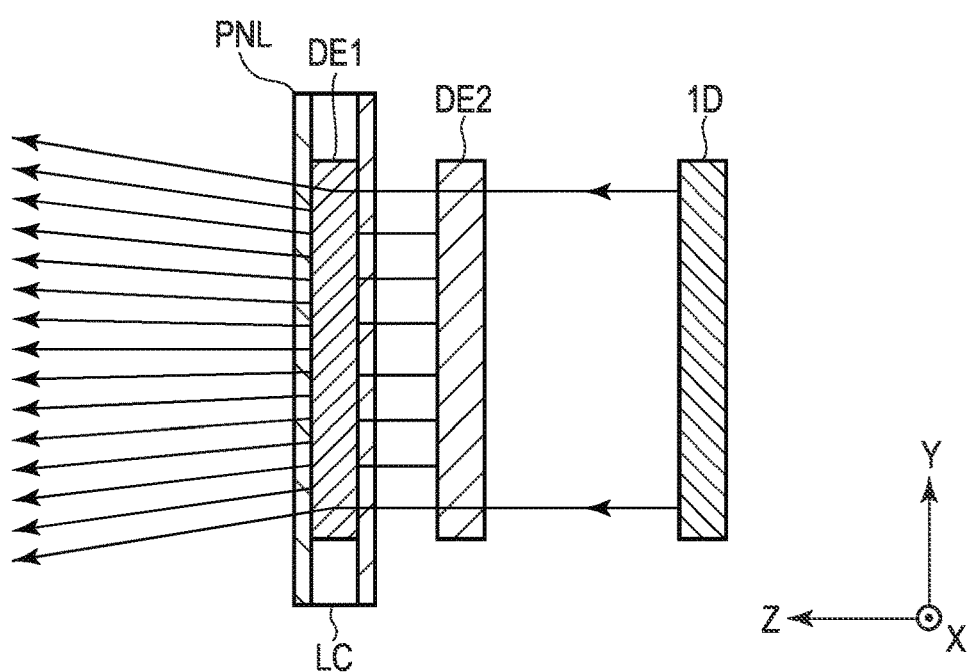
FIG. 22 is an illustration of another example of the liquid crystal panel PNL.

FIG. 22 is an illustration of another example of the liquid crystal panel PNL. The example shown in FIG. 22 differs from the example shown in FIG. 21 in that another diffractive optical element DE2 is provided between the projection element 1D and the liquid crystal panel PNL. That is, the infrared rays emitted from the projection element 1D are diffracted by the diffractive optical element DE2 and then further diffracted by the diffractive optical element DE1 of the liquid crystal panel PNL. It is thus possible to form more dot-like patterns in the X-Y plane.

Figure 23:
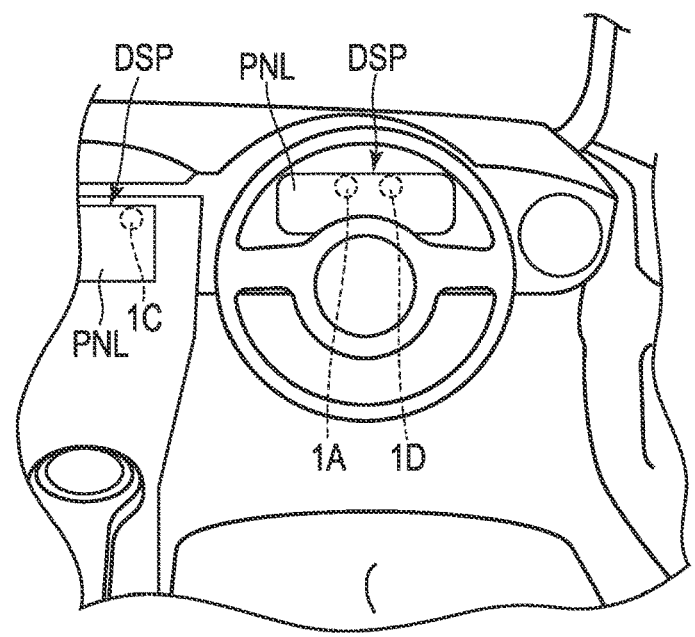
FIG. 23 is an illustration in which the liquid crystal panel PNL is applied to a display used in a vehicle.

FIG. 23 is an illustration in which the liquid crystal panel PNL is applied to a display used in a vehicle. The display device DSP, which is one of the electronic equipments for vehicles, includes a display provided at the back of a steering wheel, a display provided beside a driver's seat. The display device DSP has a liquid crystal panel PNL and elements such as a camera 1A, a proximity sensor 1B, a camera 1C and a projection element 1D, which are provided at a position superposed on the liquid crystal panel PNL.

Figure 24:
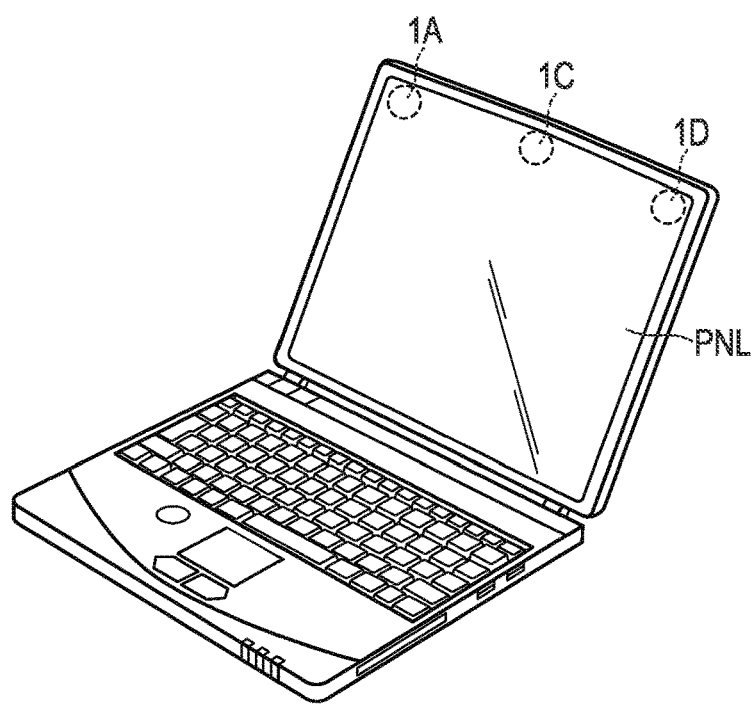
FIG. 24 is an illustration in which the liquid crystal panel PNL is applied to a computer (notebook PC) such as a laptop.

FIG. 24 shows a liquid crystal panel PNL applied to a computer (notebook PC) such as a laptop. In recent years, a narrow frame is required for a computer screen, and it is difficult to provide elements such as a camera 1A, a proximity sensor 1B, a camera 1C and a projection element 1D outside the liquid crystal panel PNL. By applying the present invention, a large screen and a narrow frame can be obtained.

As described above, according to the present embodiment, there can be provided a display device capable of enlarging a display portion, and an electronic equipment incorporating the display device. In the present embodiment, the camera 1A, proximity sensor 1B, camera 1C and projection element 1D are exemplified, but a sensor for light, sound, temperature or the like or an oscillation element for light or sound may be superposed on the liquid crystal panel PNL.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic equipment comprising:
a display panel including a display portion;
a polarizer superposed on the display portion;
a detection element superposed on the display panel and the polarizer to detect infrared rays through the display panel and the polarizer; and
a projection element superposed on the display panel and the polarizer to project infrared rays toward the display panel and the polarizer;
wherein
the display panel includes a first pixel including a first pixel electrode, a second pixel including a second pixel electrode larger than the first pixel electrode, and a common electrode opposed to the first pixel electrode and the second pixel electrode,
a first metal wiring line connects to the first pixel, and a first transparent wiring line connects to the second pixel, and
the second pixel and the first transparent wiring line are arranged in an area superposed on the detection element or the projection element.

2. The electronic equipment of claim 1, further comprising:
a light guide opposed to the display panel; and
a frame,
wherein
the detection element is located between the light guide and the frame.

3. The electronic equipment of claim 2, wherein
the light guide includes a main surface opposed to the display panel, and an opening corresponding to one of a notch and a through hole, and
the detection element and the projection element are provided in the opening.

4. The electronic equipment of claim 1, wherein
the display panel includes a light-shielding layer, and
the light-shielding layer is not provided in an area superposed on the detection element and the projection element.

5. The electronic equipment of claim 1, wherein
the display panel is configured to form a liquid crystal lens in an area superposed on the detection element and the projection element.

6. The electronic equipment of claim 1, wherein
the display panel includes a diffractive optical element in an area superposed on the projection element.

7. The electronic equipment of claim 1, wherein
the display panel includes a plurality of second pixels including the second pixel electrode larger than the first pixel electrode,
each of the second pixels except the second pixel electrode larger than the first pixel electrode is similar, and
the detection element overlaps the second pixels in plan view.

* * * * *